US006954876B2

(12) United States Patent
Ogawa et al.

(10) Patent No.: US 6,954,876 B2
(45) Date of Patent: Oct. 11, 2005

(54) DISK APPARATUS

(75) Inventors: Hitoshi Ogawa, Yokohama (JP);
Takushi Nishiya, Machida (JP); Soichi Isono, Naka (JP); Tomoki Oura, Odawara (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 513 days.

(21) Appl. No.: 10/006,669

(22) Filed: Dec. 10, 2001

(65) Prior Publication Data

US 2002/0071193 A1 Jun. 13, 2002

(30) Foreign Application Priority Data

Dec. 11, 2000 (JP) ....................................... 2000-376054

(51) Int. Cl.[7] .............................................. G06F 11/00
(52) U.S. Cl. ........................................... 714/8; 714/710
(58) Field of Search ........................... 714/7, 8, 42, 54, 714/710, 723

(56) References Cited

U.S. PATENT DOCUMENTS

| | | | | |
|---|---|---|---|---|
| 4,310,901 A | * | 1/1982 | Harding et al. ............. | 714/710 |
| 4,498,146 A | * | 2/1985 | Martinez .................... | 711/115 |
| 6,052,798 A | * | 4/2000 | Jeddeloh ....................... | 714/8 |
| 6,279,089 B1 | * | 8/2001 | Schibilla et al. ............ | 711/162 |
| 6,701,465 B1 | * | 3/2004 | Tashiro ........................ | 714/54 |
| 2001/0042223 A1 | * | 11/2001 | Hoskins ......................... | 714/8 |

FOREIGN PATENT DOCUMENTS

JP 11-7730 1/1999

* cited by examiner

Primary Examiner—Robert Beausoliel
Assistant Examiner—Gabriel L. Chu
(74) Attorney, Agent, or Firm—Mattingly, Stanger, Malur & Brundidge, P.C.

(57) ABSTRACT

Defect management information of a disk apparatus is read efficiently. Pieces of defective track information, which each indicate existence of defective tracks for a group of a plurality of tracks, are stored being associated with physical track numbers. And, pieces of defect information on defective tracks are stored in predetermined groups. Further, pieces of pointer information that indicate start addresses of storage address for the above-mentioned predetermined groups are stored. When a processing means receives an instruction of read or write to a track of a storage medium, the processing means refers to a piece of defective track information based on the above-mentioned addresses. When existence of a defective track is indicated, the processing means refers to a piece of pointer information corresponding to the group relating to the referred piece of defective track information. Then, the processing means sequentially accesses the pieces of defect information from the storage area indicated by the above-mentioned piece of pointer information, to detect a piece of defect information of the track as the object of the instruction. Then, the processing means performs defect processing on the defective track based on the defect information detected.

5 Claims, 31 Drawing Sheets

FIG.1

METHOD OF ACCESSING DEFECT INFORMATION
(STEP 1) MPU DESIGNATES A TARGET ADDRESS TO DF.

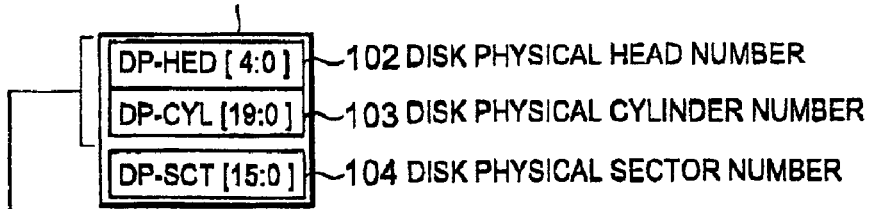

101 DISK PHYSICAL CHS NUMBER
- DP-HED [4:0] — 102 DISK PHYSICAL HEAD NUMBER
- DP-CYL [19:0] — 103 DISK PHYSICAL CYLINDER NUMBER
- DP-SCT [15:0] — 104 DISK PHYSICAL SECTOR NUMBER (STEP 2) DM USES THIS TARGET ADDRESS TO LOAD THE DEFECT INFORMATION ON THE TRACK IN QUESTION
DM USES THIS NUMBER TO LOAD THE DEFECT INFORMATION FROM THE DEFECT STORAGE ADDRESS (ADDRESS SHOWN BELOW) IN THE BUFFER.

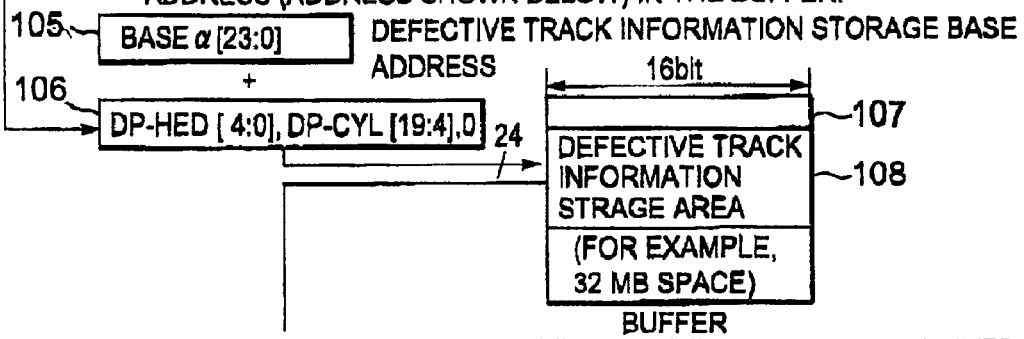

105 — BASE α [23:0]  DEFECTIVE TRACK INFORMATION STORAGE BASE ADDRESS
106 — DP-HED [4:0], DP-CYL [19:4], 0
107 — 
108 — DEFECTIVE TRACK INFORMATION STRAGE AREA
(FOR EXAMPLE, 32 MB SPACE)
BUFFER (STEP 3) TOP STORAGE ADDRESS AT WHICH A DEFECT EXISTS IS OBTAINED FROM THE DEFECT INFORMATION LOADED.

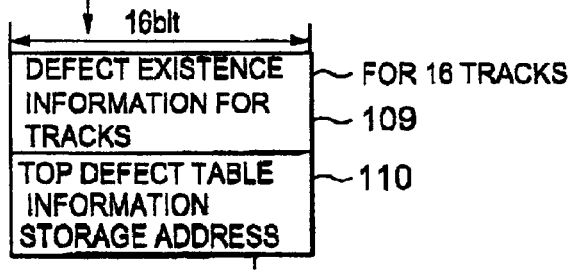

- DEFECT EXISTENCE INFORMATION FOR TRACKS — FOR 16 TRACKS — 109
- TOP DEFECT TABLE INFORMATION STORAGE ADDRESS — 110

(STEP 4) TOP STORAGE ADDRESS AT WHICH DEFECT TABLE INFORMATION EXISTS IS OBTAINED FROM THE DEFECT INFORMATION LOADED.

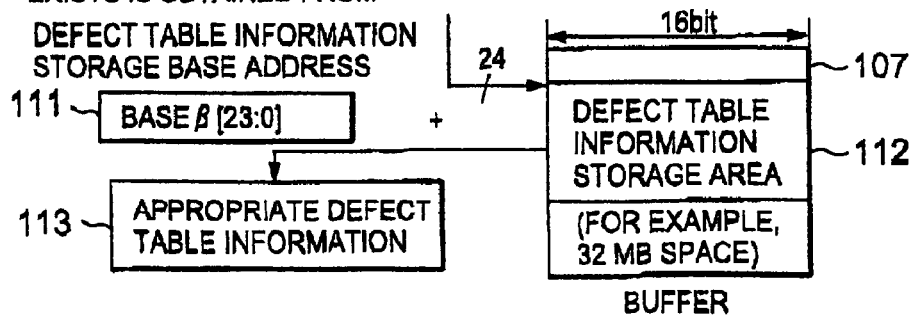

DEFECT TABLE INFORMATION STORAGE BASE ADDRESS
111 — BASE β [23:0]
107 —
112 — DEFECT TABLE INFORMATION STORAGE AREA
(FOR EXAMPLE, 32 MB SPACE)
113 — APPROPRIATE DEFECT TABLE INFORMATION
BUFFER

EXAMPLE OF FORMAT OF DEFECTIVE TABLE INFORMATION STORAGE ADDRESS (TYPE 1)

FORMAT OF DEFECT TABLE INFORMATION STORAGE AREA (TYPE 1)

( * 1) 7bit RESERVED  601 DEFECT TABLE FORMAT

SECTOR ALLOCATION MAP INCLUDING DEFECTS

FIG.8

INFORMATION REQUIRED FOR A DEFECT ELEMENT

| KIND OF DEFECT INFORMATION | CONTENTS |
|---|---|
| (1) SKIP INFORMATION | 1) DISK PHYSICAL SECTOR NUMBER (DP-SCT [19:0]) AT WHICH A DEFECT EXISTS.<br>2) DISK PHYSICAL SECTOR NUMBER OF SUBSTITUTE (AP-CYL [19:0], AP-HED[4:0], AP-SCT [15:0 ])<br>3) THE NUMBER OF SECTORS TO BE SKIPPED SUCCESSIVELY (DP-SCTCNT[15:0]) |
| (2) SLIP INFORMATION | 1) DISK PHYSICAL NUMBER (DP-SCT[15:0] AT WHICH A DEFECT EXISTS.<br>2) THE NUMBER OF SECTORS TO BE SLIPPED SUCCESSIVELY (ADP-SECNUM[15:0]) |
| (3) END SECTOR INFORMATION | 1) END SECTOR NUMBER (DP-SCT[15:0]) OF THE TRACK CONCERNED WHEN THE END SECTOR IS UNUSABLE AS A DEFECTIVE SECTOR, THE USABLE END DISK PHYSICAL SECTOR NUMBER IN THE TRACK IS DESIGNATED |

FIG.9
FORMAT OF DEFECT ELEMENT (FIRST)
(1) SKIP OF ONE SECTOR (4 W)
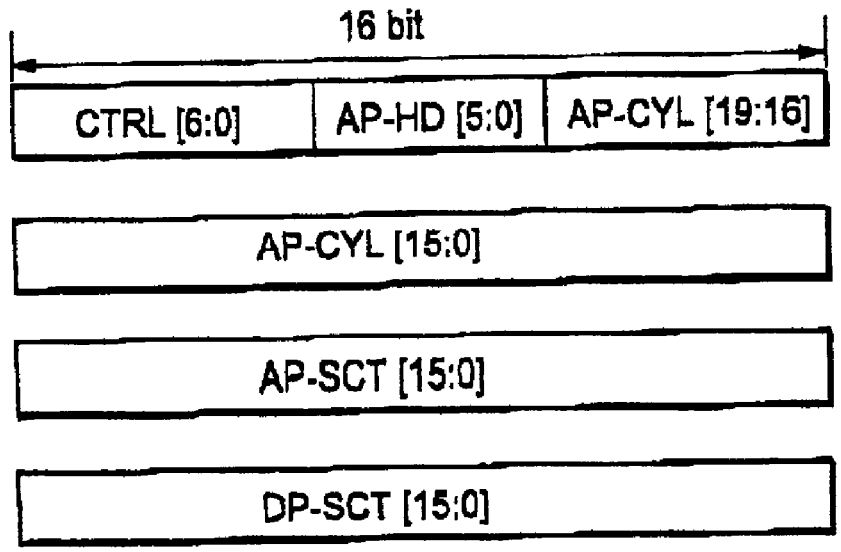
(2) SKIP OF SUCCESSIVE SECTORS (5 W)
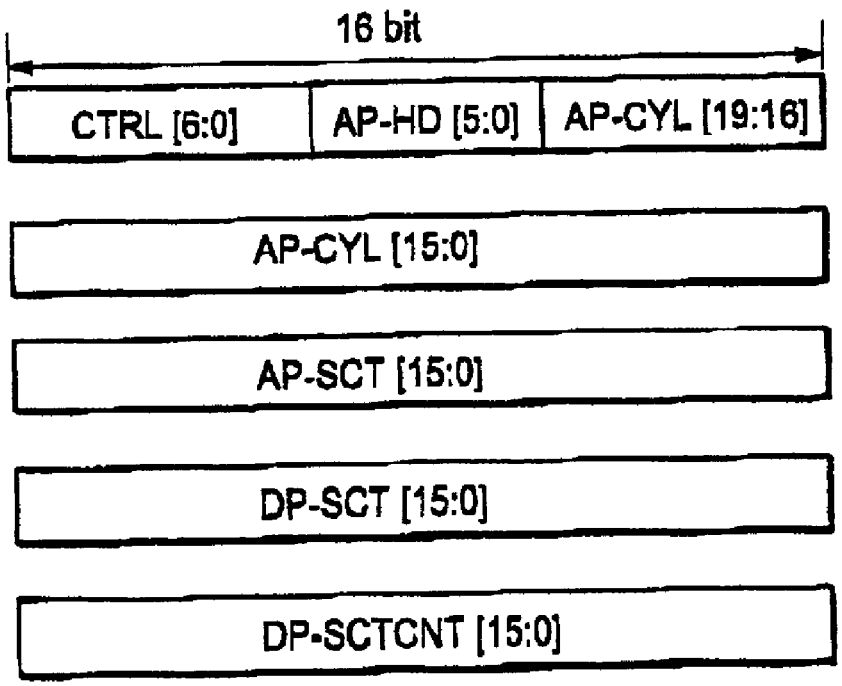

FIG. 10
FORMAT OF DEFECT ELEMENT (SECOND)
(3) SLIP OF ONE SECTOR (2 W)
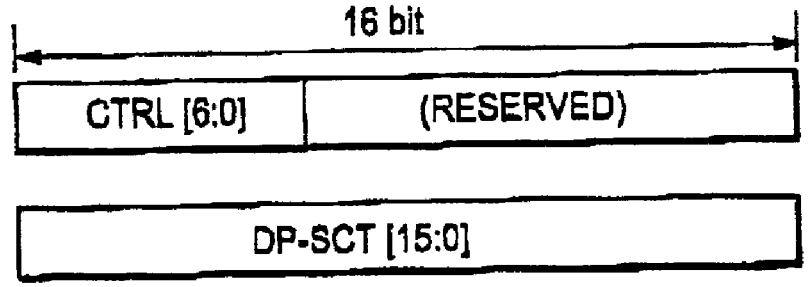
(4) SLIP OF SUCCESSIVE SECTORS (3 W)
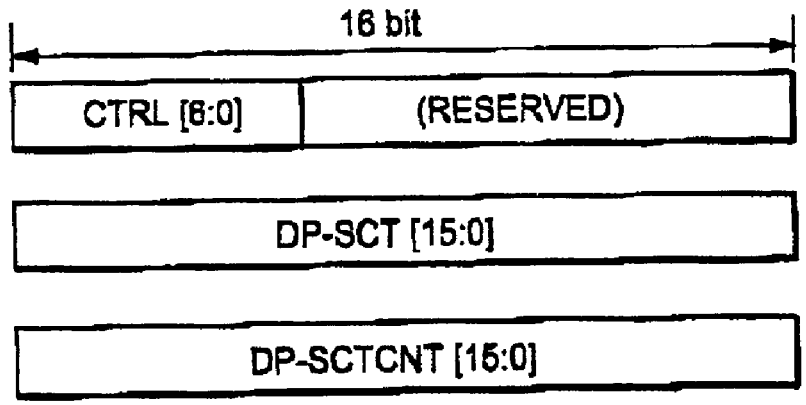
(5) END SECTOR (2 W)
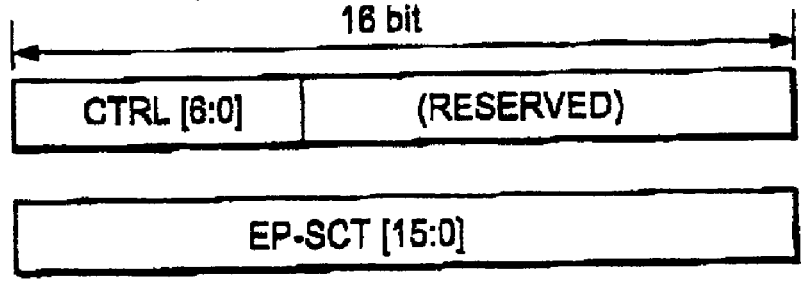
(6) BOUNDARY OF THE DEFECT TABLE (1 W)
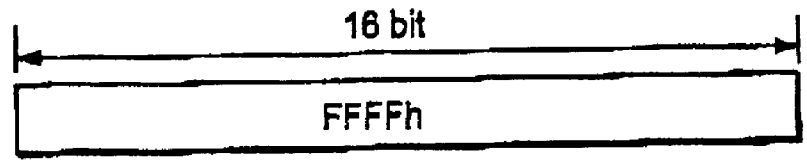

FIG.11

FORMAT OF CONTROL INFORMATION (1) CONTROL INFORMATION

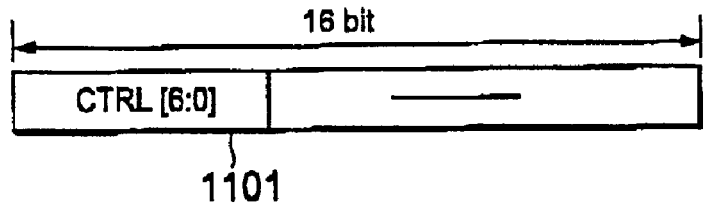

1101

CTRL [6] : END OF SECTOR
  1: END SECTOR NUMBER OF THE TRACK
CTRL [5] : SKIP/SLIP
  INDICATION OF SKIP OR SLIP
  1: SKIP, 0: SLIP
CTRL [4] : SEQUENTIAL
  INDICATION OF SUCCESSIVE SECTORS PROCESSING
  1: SUCCESSIVE SECTOR PROCESSING, 0: ONE SECTOR PROCESSING
CTRL [3] : SPARE ON TRACK
  INDICATION IF A SUBSTITUTE OF THE DEFECTIVE SECTOR EXISTS
  ON THE CURRENT TRACK
  1: CURRENT TRACK, 0: ANOTHER TRACK
CTRL [2] : (RESERVED)
CTRL [1] : (RESERVED)
CTRL [0] : (RESERVED)

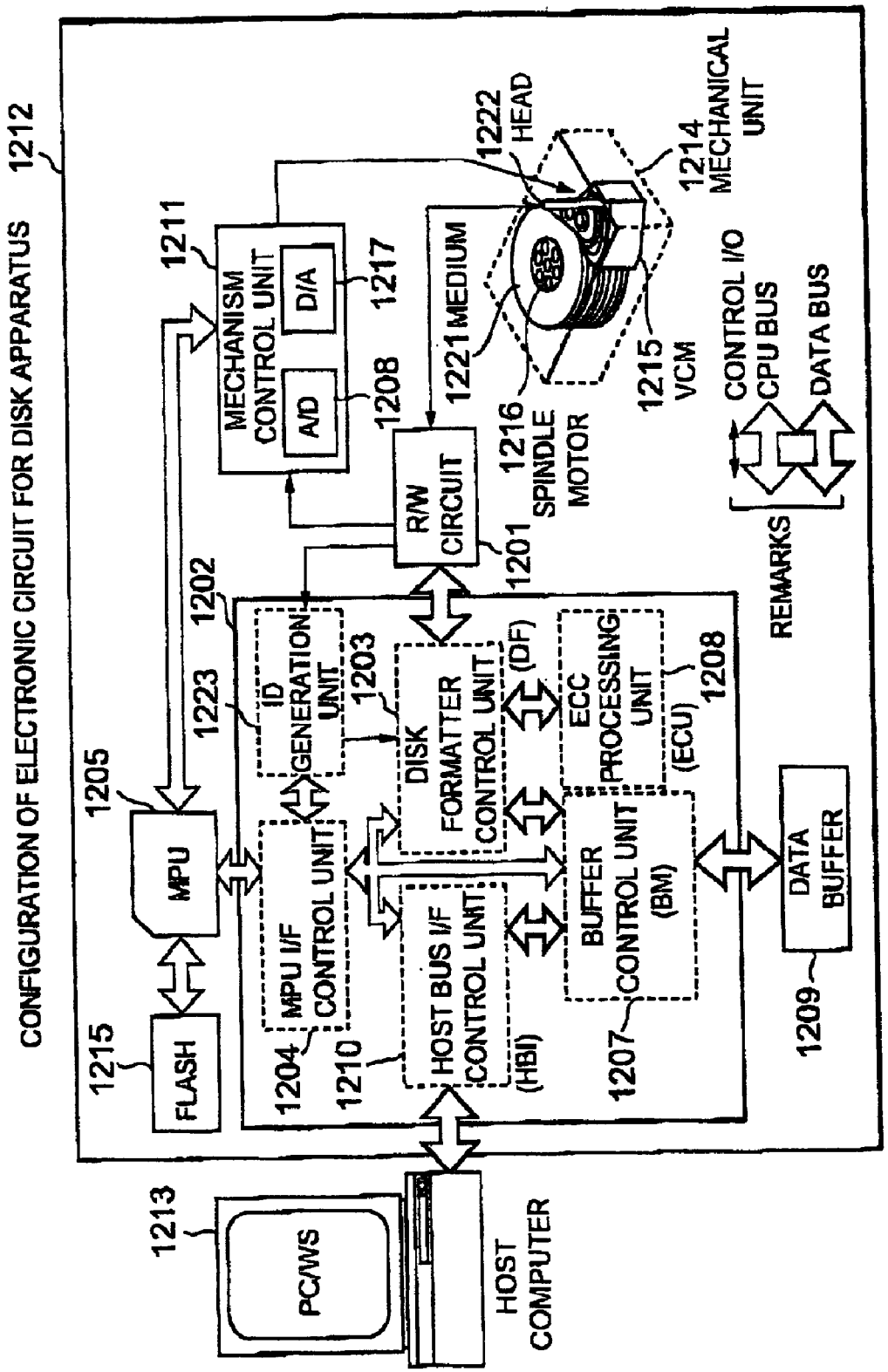
FIG.12 CONFIGURATION OF ELECTRONIC CIRCUIT FOR DISK APPARATUS

FIG.14

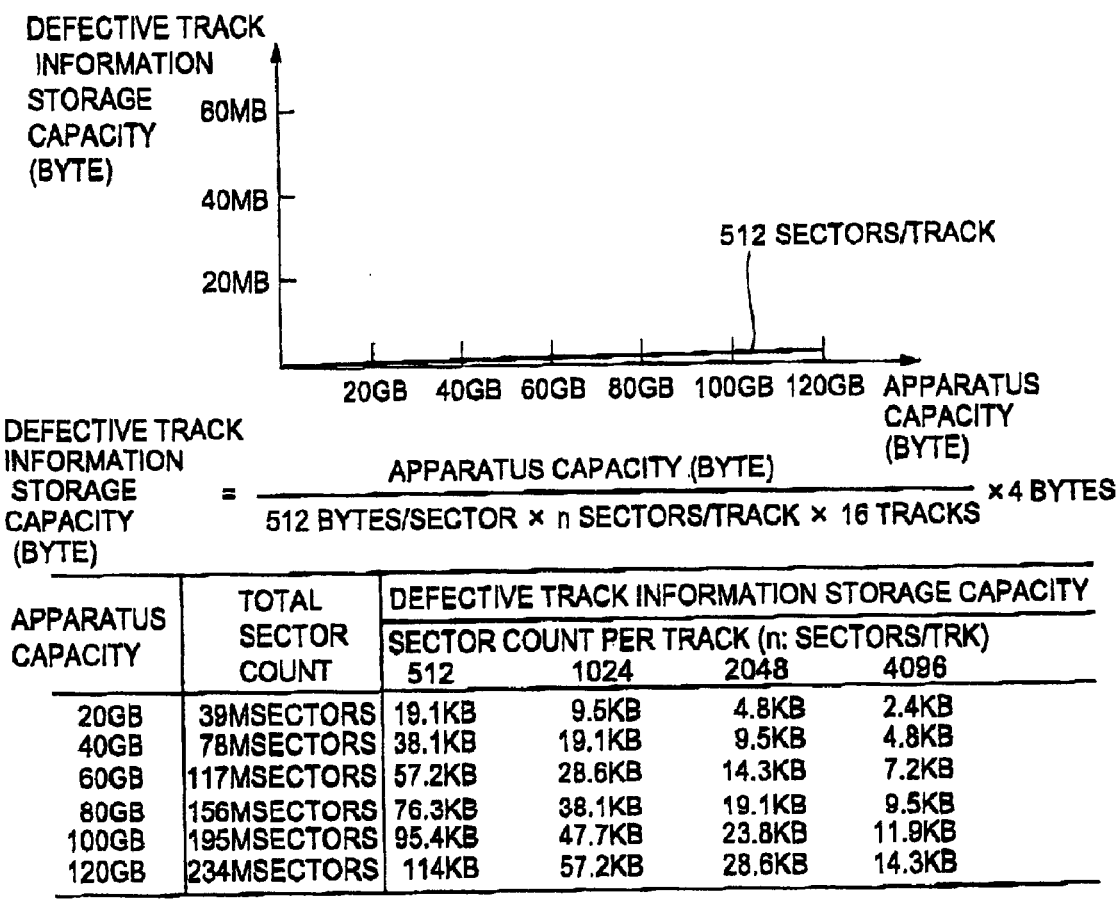

APPARATUS CAPACITY AND TRACK INFORMATION STORAGE CAPACITY(TYPE 1)

$$\text{DEFECTIVE TRACK INFORMATION STORAGE CAPACITY (BYTE)} = \frac{\text{APPARATUS CAPACITY (BYTE)}}{512 \text{ BYTES/SECTOR} \times n \text{ SECTORS/TRACK} \times 16 \text{ TRACKS}} \times 4 \text{ BYTES}$$

| APPARATUS CAPACITY | TOTAL SECTOR COUNT | DEFECTIVE TRACK INFORMATION STORAGE CAPACITY SECTOR COUNT PER TRACK (n: SECTORS/TRK) | | | |
|---|---|---|---|---|---|
| | | 512 | 1024 | 2048 | 4096 |
| 20GB | 39MSECTORS | 19.1KB | 9.5KB | 4.8KB | 2.4KB |
| 40GB | 78MSECTORS | 38.1KB | 19.1KB | 9.5KB | 4.8KB |
| 60GB | 117MSECTORS | 57.2KB | 28.6KB | 14.3KB | 7.2KB |
| 80GB | 156MSECTORS | 76.3KB | 38.1KB | 19.1KB | 9.5KB |
| 100GB | 195MSECTORS | 95.4KB | 47.7KB | 23.8KB | 11.9KB |
| 120GB | 234MSECTORS | 114KB | 57.2KB | 28.6KB | 14.3KB |

FIG.15

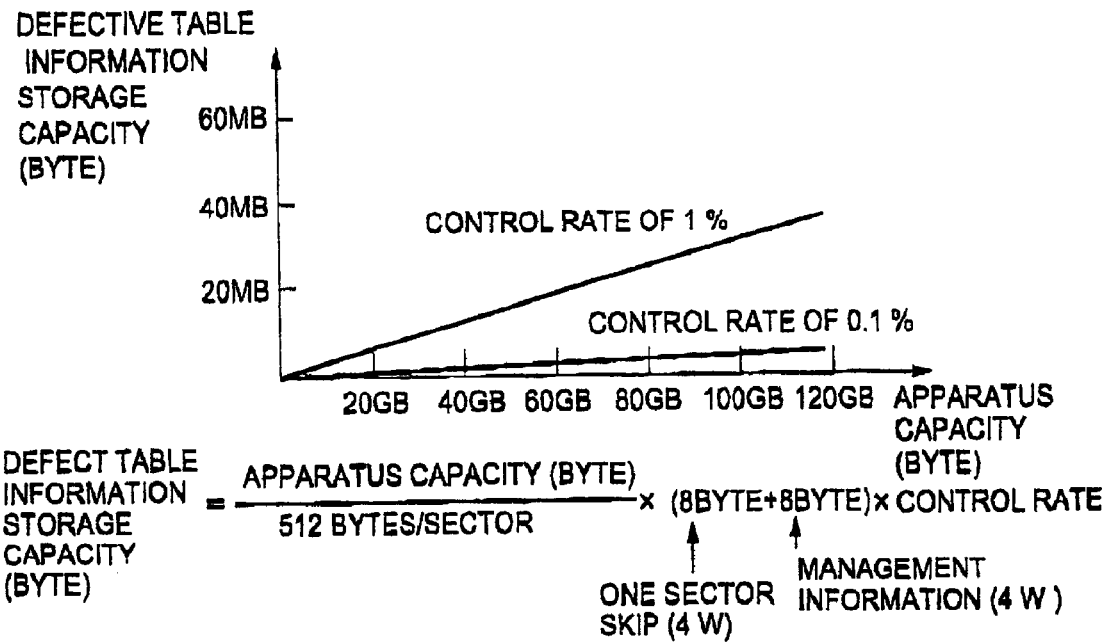

APPARATUS CAPACITY AND DEFECT TABLE INFORMATION STORAGE CAPACITY (TYPE1)

$$\text{DEFECT TABLE INFORMATION STORAGE CAPACITY (BYTE)} = \frac{\text{APPARATUS CAPACITY (BYTE)}}{512 \text{ BYTES/SECTOR}} \times (8\text{BYTE} + 8\text{BYTE}) \times \text{CONTROL RATE}$$

ONE SECTOR SKIP (4 W)  MANAGEMENT INFORMATION (4 W)

CONTROL RATE = CONTROLLED NUMBER OF DEFECTIVE SECTORS/NUMBER OF ALL SECTORS IN APPARATUS (a) CONTROL RATE OF 0.1 %

| APPARATUS CAPACITY | TOTAL SECTOR COUNT | DEFECT TABLE INFORMATION STORAGE CAPACITY |
|---|---|---|
| 20GB | 39MSECTORS | 39 K DEFECTIVE SECTORS (625 KB) |
| 40GB | 78MSECTORS | 78 K DEFECTIVE SECTORS (1.3MB) |
| 60GB | 117MSECTORS | 117K DEFECTIVE SECTORS (1.9MB) |
| 80GB | 156MSECTORS | 156K DEFECTIVE SECTORS (2.5MB) |
| 100GB | 195MSECTORS | 195K DEFECTIVE SECTORS (3.1MB) |
| 120GB | 234MSECTORS | 234K DEFECTIVE SECTORS (3.8MB) |

(b) CONTROL RATE OF 1%

| APPARATUS CAPACITY | TOTAL SECTOR COUNT | DEFECT TABLE INFORMATION STORAGE CAPACITY |
|---|---|---|
| 20GB | 39MSECTORS | 390 K DEFECTIVE SECTORS (6.3MB) |
| 40GB | 78MSECTORS | 780 K DEFECTIVE SECTORS (13MB) |
| 60GB | 117MSECTORS | 1.2M DEFECTIVE SECTORS (19MB) |
| 80GB | 156MSECTORS | 1.6M DEFECTIVE SECTORS (25MB) |
| 100GB | 195MSECTORS | 2.0M DEFECTIVE SECTORS (31MB) |
| 120GB | 234MSECTORS | 2.3M DEFECTIVE SECTORS (38MB) |

(*1)7bit RESERVED

FORMAT OF DEFECT TABLE INFORMATION STORAGE AREA (TYPE2-B)
(FOR DISK PHYSICAL HEADS 0-3)

FIG.24

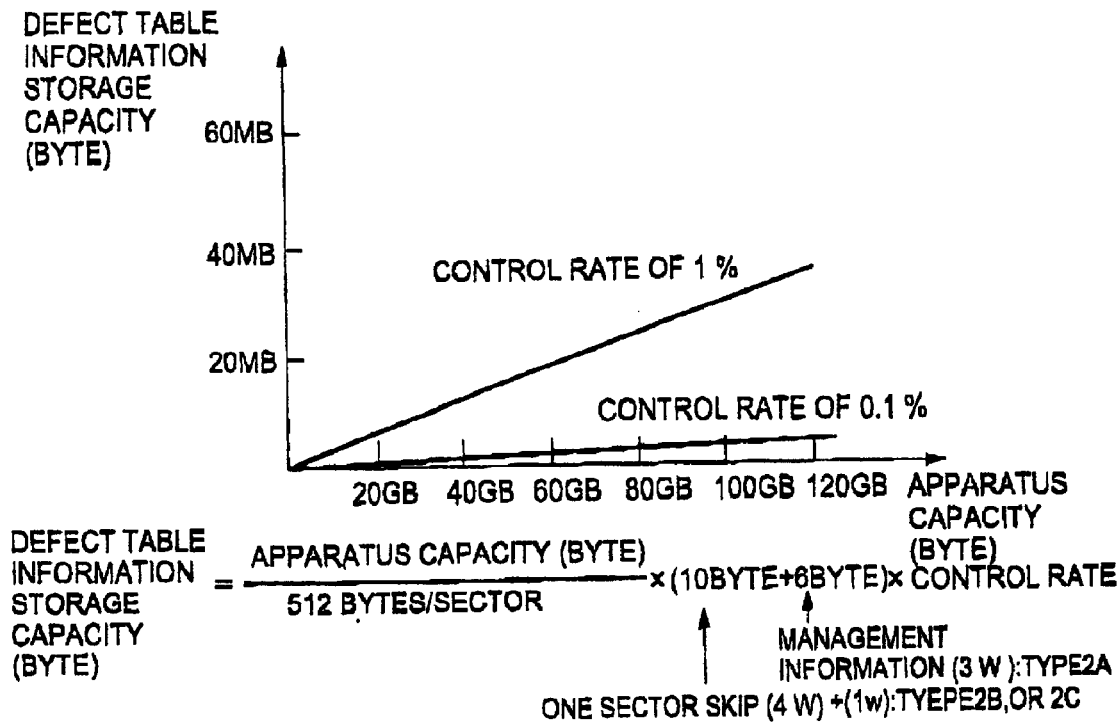

APPARATUS CAPACITY AND DEFECT TABLE INFORMATION STORAGE CAPACITY (TYPE2)

DEFECT TABLE INFORMATION STORAGE CAPACITY (BYTE) = $\dfrac{\text{APPARATUS CAPACITY (BYTE)}}{512 \text{ BYTES/SECTOR}} \times (10\text{BYTE} + 6\text{BYTE}) \times$ CONTROL RATE

- ONE SECTOR SKIP (4 W) +(1w):TYEPE2B, OR 2C
- MANAGEMENT INFORMATION (3 W):TYPE2A

CONTROL RATE = CONTROLLED NUMBER OF DEFECTIVE SECTORS/NUMBER OF ALL SECTORS IN APPARATUS (a) CONTROL RATE OF 0.1 %

| APPARATUS CAPACITY | TOTAL SECTOR COUNT | DEFECT TABLE INFORMATION STORAGE CAPACITY |
|---|---|---|
| 20GB | 39M SECTORS | 39 K DEFECTIVE SECTORS (625KB) |
| 40GB | 78M SECTORS | 78 K DEFECTIVE SECTORS (1.3MB) |
| 60GB | 117M SECTORS | 117K DEFECTIVE SECTORS (1.9MB) |
| 80GB | 156M SECTORS | 156K DEFECTIVE SECTORS (2.5MB) |
| 100GB | 195M SECTORS | 195K DEFECTIVE SECTORS (3.1MB) |
| 120GB | 234M SECTORS | 234K DEFECTIVE SECTORS (3.8MB) |

(b) CONTROL RATE OF 1%

| APPARATUS CAPACITY | TOTAL SECTOR COUNT | DEFECT TABLE INFORMATION STORAGE CAPACITY |
|---|---|---|
| 20GB | 39M SECTORS | 390 K DEFECTIVE SECTORS (6.3MB) |
| 40GB | 78M SECTORS | 780 K DEFECTIVE SECTORS (13MB) |
| 60GB | 117M SECTORS | 1.2M DEFECTIVE SECTORS (19MB) |
| 80GB | 156M SECTORS | 1.6M DEFECTIVE SECTORS (25MB) |
| 100GB | 195M SECTORS | 2.0M DEFECTIVE SECTORS (31MB) |
| 120GB | 234M SECTORS | 2.3M DEFECTIVE SECTORS (38MB) |

FIG.25

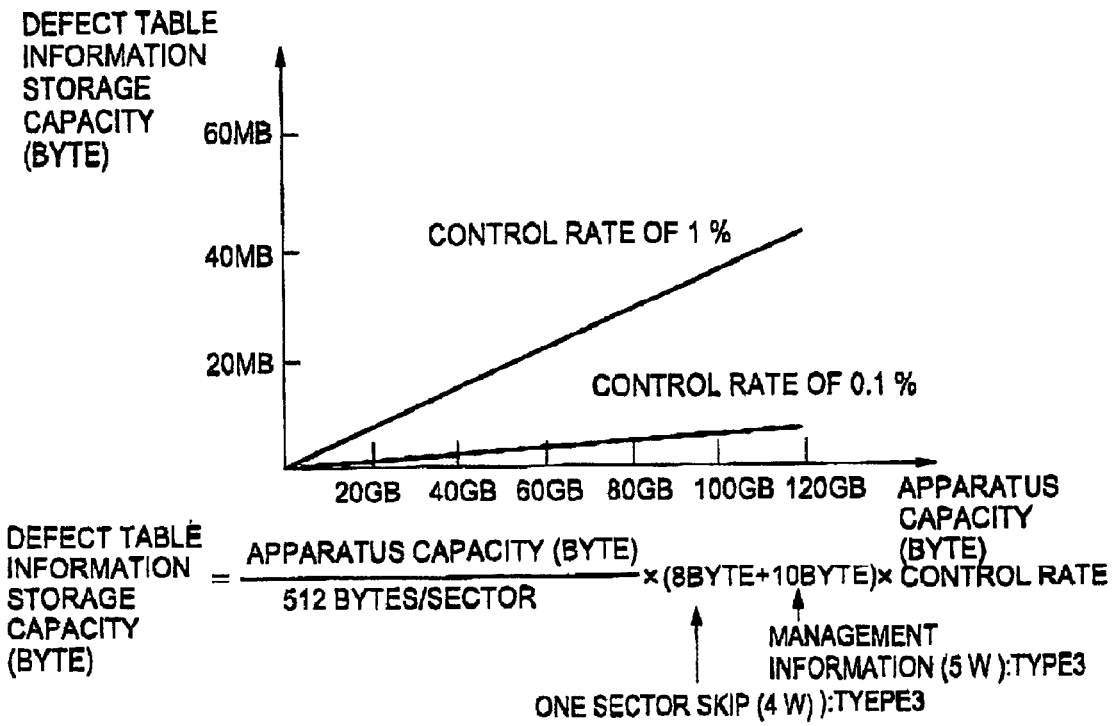

APPARATUS CAPACITY AND DEFECT TABLE
INFORMATION STORAGE CAPACITY (TYPE3)

$$\text{DEFECT TABLE INFORMATION STORAGE CAPACITY (BYTE)} = \frac{\text{APPARATUS CAPACITY (BYTE)}}{512 \text{ BYTES/SECTOR}} \times (8\text{BYTE}+10\text{BYTE}) \times \text{CONTROL RATE}$$

ONE SECTOR SKIP (4 W) :TYEPE3
MANAGEMENT INFORMATION (5 W) :TYPE3

CONTROL RATE = CONTROLLED NUMBER OF DEFECTIVE SECTORS/NUMBER OF ALL SECTORS IN APPARATUS (a) CONTROL RATE OF 0.1 %

| APPARATUS CAPACITY | TOTAL SECTOR COUNT | DEFECT TABLE INFORMATION STORAGE CAPACITY |
|---|---|---|
| 20GB | 39M SECTORS | 39 K DEFECTIVE SECTORS (700KB) |
| 40GB | 78M SECTORS | 78 K DEFECTIVE SECTORS (1.4MB) |
| 60GB | 117M SECTORS | 117K DEFECTIVE SECTORS (2.1MB) |
| 80GB | 156M SECTORS | 156K DEFECTIVE SECTORS (2.8MB) |
| 100GB | 195M SECTORS | 195K DEFECTIVE SECTORS (3.5MB) |
| 120GB | 234M SECTORS | 234K DEFECTIVE SECTORS (4.2MB) |

(b) CONTROL RATE OF 1%

| APPARATUS CAPACITY | TOTAL SECTOR COUNT | DEFECT TABLE INFORMATION STORAGE CAPACITY |
|---|---|---|
| 20GB | 39M SECTORS | 390 K DEFECTIVE SECTORS (7MB) |
| 40GB | 78M SECTORS | 780 K DEFECTIVE SECTORS (14MB) |
| 60GB | 117M SECTORS | 1.2M DEFECTIVE SECTORS (21MB) |
| 80GB | 156M SECTORS | 1.6M DEFECTIVE SECTORS (28MB) |
| 100GB | 195M SECTORS | 2.0M DEFECTIVE SECTORS (35MB) |
| 120GB | 234M SECTORS | 2.3M DEFECTIVE SECTORS (42MB) |

FIG.26

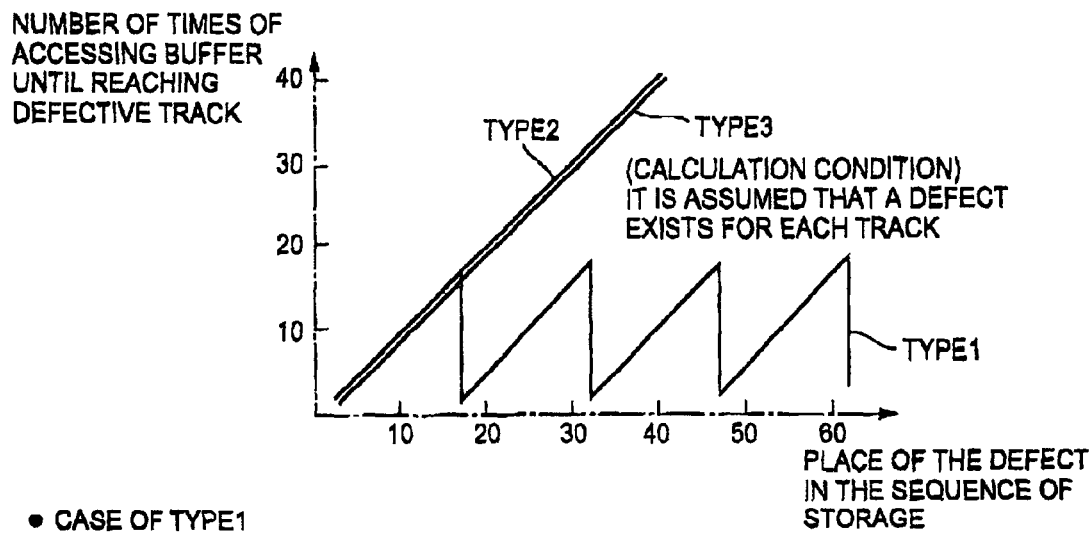

COMPARISON OF NUMBERS OF TIMES OF ACCESSING BUFFER REQUIRED UNTIL REACHING TARGET DEFECTIVE TRACK

- CASE OF TYPE1
  - (PROCEDURE 1) ACCESS TO DEFECTIVE TRACK INFORMATION STORAGE AREA
  - (PROCEDURE 2) ACCESS TO TOP OF DEFECT TABLE INFORMATION STORAGE AREA
  - (PROCEDURE 3) ACCESS TO DEFECT TABLE INFORMATION STORAGE AREA
  - (2ND THROUGH 16TH AT MAXIMUM; IN THE SEQUENCE OF STORAGE)
- CASE OF TYPE2
  - (PROCEDURE 1) ACCESS TO DEFECTIVE TRACK INFORMATION STORAGE AREA
    (IN ORDER OR STORAGE)
  - (PROCEDURE 2) ACCESS TO DEFECT TABLE INFORMATION
- CASE OF TYPE3
  - (PROCEDURE 1) ACCESS TO DEFECTIVE TRACK INFORMATION STORAGE AREA
    (IN ORDER OF STORAGE)

TABLE: DEFECTIVE TRACK STORAGE NUMBER AND THE NUMBER OF TIMES OF ACCESSING THE BUFFER

| PLACE OF THE DEFECTIVE TRACK IN THE SEQUENCE OF STORAGE | NUMBER OF TIMES OF ACCESSING THE BUFFER | | |
|---|---|---|---|
| | TYPE1 | TYPE2 | TYPE3 |
| 1 | 2 | 2 | 1 |
| 2 | 3 | 3 | 2 |
| 3 | 4 | 4 | 3 |
| ... | | | |
| 16 | 17 | 17 | 16 |
| 17 | 2 | 18 | 17 |
| 18 | 3 | 19 | 18 |
| ... | | | |
| n | RESIDUE (n/16) +1 | n+1 | n |

METHOD OF GENERATING OFFSET ADDRESS
FOR DEFECTIVE TRACK INFORMATION (SECOND)

FIG.29
EXAMPLE OF FORMAT OF DEFECTIVE TRACK INFORMATION
FOR TRACKS (TYPE 4)
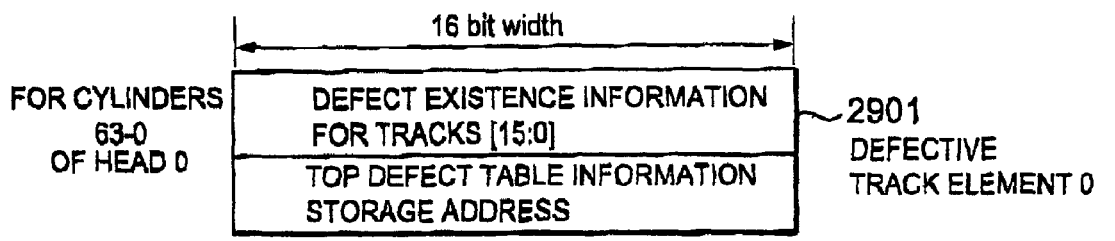
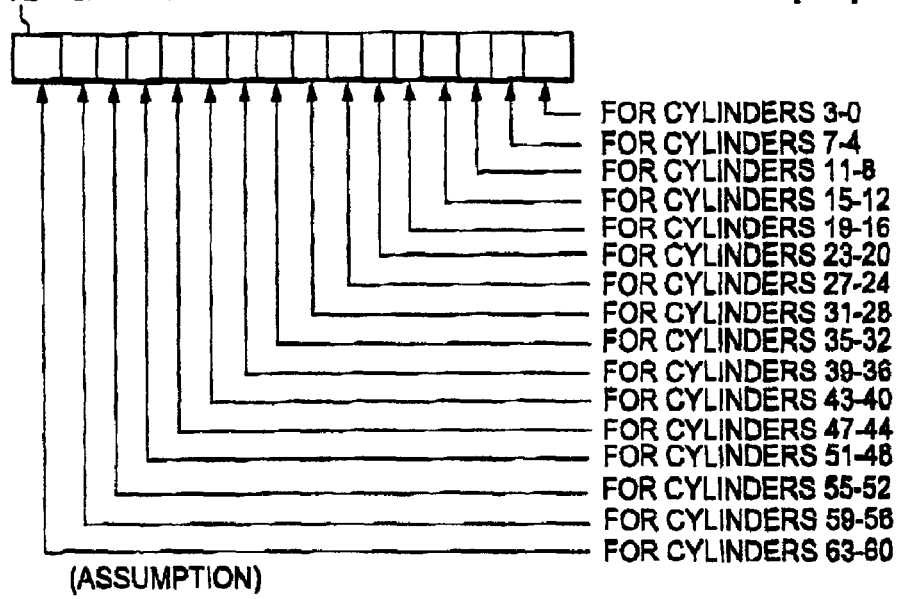

FIG. 31

COMPARISON OF SYSTEMS

| SYSTEM | | TYPE 1 | TYPE 2 | TYPE 3 | TYPE 4 |
|---|---|---|---|---|---|
| | | WHOLE TRACK INFORMATION STORING | DEFECT TABLE INFORMATION STORING | DEFECT TABLE INFORMATION STORING | WHOLE TRACK INFORMATION COMPRESSING AND STORING |
| | DEFECTIVE TRACK INFORMATION | ALL TRACKS | — | — | COMPRESSED AND FOR ALL TRACKS |
| | DEFECT TABLE INFORMATION | DEFECTIVE TRACKS ONLY | DEFECTIVE TRACKS ONLY | SEARCHABLE FORWARD AND BACKWARD DEFECTIVE TRACKS | DEFECTIVE TRACKS ONLY |
| DEFECTIVE TRACK INFORMATION CAPACITY | | $\alpha$ | — | — | $\alpha/2^{(R+4)}$ |
| DEFECT TABLE INFORMATION CAPACITY | | $\beta$ | $1.1\beta$ | $1.1\beta$ | $\beta$ |
| NECESSITY OF PUTTING DEFECT TABLES IN ORDER OF ADDRESS | | YES | — | YES | YES |
| NECESSITY OF PUTTING DEFECT TABLES IN ORDER OF ADDRESS | | NO | YES | YES | NO |
| NECESSITY FOR F/W TO KNOW STORAGE ADDRESS | | YES | YES | NO | YES |
| NUMBER OF TIMES OF ACCESSING BUFFER UNTIL REACHING TARGET DEFECT TABLE | | $2 - 17$ | $n + 1$ | $n$ | $2 \cdot 2^{(R+4)} + 1$ |

(*1) R IS RIGHT SHIFT AMOUNT
(*2) n IS PLACE OF DEFECT IN SEQUENCE OF STORAGE, COUNTING FROM THE SMALLEST ADDRESS
(*3) $\alpha$ AND $\beta$ ARE A CONSTANT FOR COMPARISON OF CAPACITY RATIO (BYTE COUNT) OF EACH TYPE

FIG.32

CONVERSION FROM HOST LOGICAL NUMBER
TO DISK PHYSICAL NUMBER

3201 HOST LOGICAL CHS NUMBER

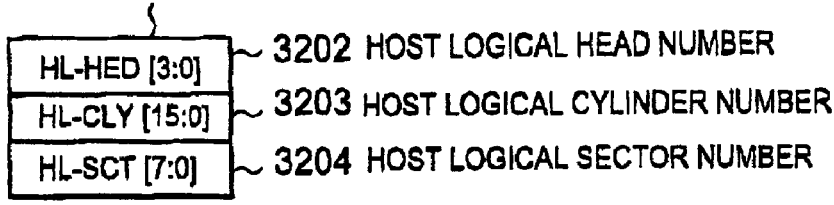

— 3202 HOST LOGICAL HEAD NUMBER
— 3203 HOST LOGICAL CYLINDER NUMBER
— 3204 HOST LOGICAL SECTOR NUMBER

OR

3205 HOST LOGICAL LBA NUMBER

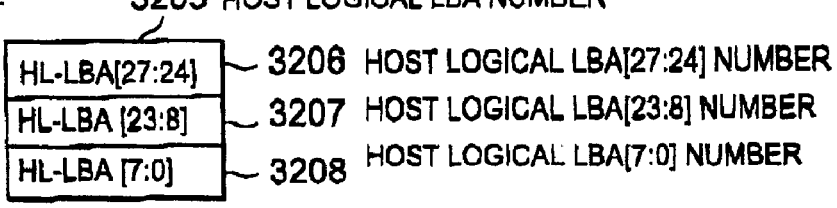

— 3206 HOST LOGICAL LBA[27:24] NUMBER
— 3207 HOST LOGICAL LBA[23:8] NUMBER
— 3208 HOST LOGICAL LBA[7:0] NUMBER

⇩

3209 DISK PHYSICAL CHS NUMBER

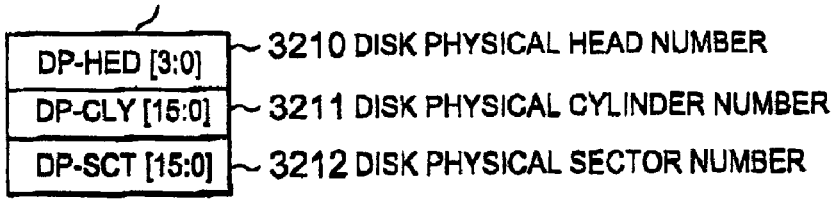

— 3210 DISK PHYSICAL HEAD NUMBER
— 3211 DISK PHYSICAL CYLINDER NUMBER
— 3212 DISK PHYSICAL SECTOR NUMBER

DISK APPARATUS

BACKGROUND OF THE INVENTION

The present invention relates to a disk apparatus, and in particular to a sector address generation method in which information on defects of tracks to be accessed by a head can be detected with a smaller number of times of accessing, without depending on their storage locations.

Recently, a disk apparatus is rapidly becoming smaller-sized, faster, more sophisticated and cheaper. In particular, there is a tendency to become larger in storage capacity, so that a unit area recording density is improved to be more than 10 Gbit per one inch square. Such a high-density storage generates many failure-generating sectors, which can not be used as sectors. The number of defective sectors of a storage capacity is less than about 0.1% at maximum. A hot-selling 3.5-inch disk apparatus has a capacity of about 20 GB, and the maximum number of defective sectors is:

(20 GB×0.1%)/512 Bytes=about 40,000 sectors.

At present, recording density of a disk apparatus is increased at a pace that capacity is doubled in a year. Thus, three years later, the number of defective sectors will exceed 150,000 sectors. A disk apparatus reads and writes data from a host, while performing processing in which defective sectors are avoided as unusable sectors. This processing is called defective sector processing.

The defective sector processing will be described in detail referring to a diagram of FIG. 32 explaining conversion of a host logical number to a disk physical number, and referring to a sector allocation map of FIG. 7 for sectors including defective ones. FIG. 32 is a diagram showing a relation between a number designated by a host and a physical number indicating a physical location. The host sends a disk apparatus designation of a sector in terms of a host logical CHS number 3201, which is a Cylinder-Head-Sector number (hereinafter, referred to as a CHS number) in the disk apparatus as seen from the host, or in terms of a host logical LBA number 3205, which is a Logical Block Address number (hereinafter, referred to as an LBA number) simply as a serial number.

Here, a host logical CHS number 3201 consists of a host logical head number 3202, a host logical cylinder number 3203, and a host logical sector number 3204. Further, in the case of a host logical LBA number, a host logical LBA number [27:0] consists of three LBA numbers 3206, 3207, and 3208.

On the side of the disk apparatus, an MPU contained in the disk apparatus reads the logical CHS number or the logical LBA number set by the host, to specify an actual sector number. Or, the actual sector number may be specified by a hardware conversion unit. This result becomes a disk physical CHS number 3209. This disk physical CHS number 3209 consists of a disk physical head number 3210, a disk physical cylinder number 3211, and a disk physical sector number 3212. Using a pair of disk physical head number 3210 and disk physical cylinder number 3211, a magnetic head can be located. This disk physical CHS number Indicates an actual location where the host wishes to read or write. Thus, the sector concerned is found based on this number, to read or write data. [27:0] indicates the host LBA number from bit0 to bit27, namely 28 bit bus width.

FIG. 7 shows a sector allocation map. A disk apparatus records data into sectors on a medium 701. As an ordinary technique of increasing its capacity, the medium utilizes Zone Bit Recording. FIG. 7 shows a case of three zones, i.e., ZONE0 702, ZONE1 703 and ZONE2 704. Within a zone, there are a plurality of tracks 706–710, each consisting of a plurality of sectors in a circumference. Here, in FIG. 7, the reference numerals 706–710 refer to actual tracks within the ZONE1. One track contains A+1 sectors 0–A (A+1 sectors/track), and the ZONE1 contains n+1 tracks, i.e., track m—track m+n (n+1 tracks/zone), which a user can handle. Further, the figure shows that a track L 710 is a substitute track used for replacing a defect sector in the same ZONE1.

Further, the figure shows a case where, between adjacent tracks, there is provided a skew for processing the next sector, such that the head is located at a leading sector in the next track just when the moving time of the head is finished after the head processed the last sector in the current track. FIG. 7 shows a case where the skew value is 2 sectors. Although a physical sector number is thus assigned to each sector, there exist some defective sectors that can not be used, among the sectors. A number of such a sector should be replaced by a number of a normal sector. As a method of replacing, there are two methods, i.e., a slip processing 711, where sectors are shifted one by one, and a skip processing 712, where a defective sector is replaced by another area. Accordingly, in order to specify a sector, it is necessary to take slips or skips into consideration to specify a disk physical number (called a disk physical CHS number) allocated from the top of the disk apparatus.

Using the MPU, the disk apparatus obtains a disk physical CHS number from a host logical CHS (LBA) number designated by the host. Then, after the head is positioned at the track concerned, the disk apparatus performs sector number control, utilizing defect control information (defect management information) for performing the slip or skip processing for that track. For example, in the sector allocation map shown in FIG. 7, it is assumed that the sector designated by the host exists on the track m+n. The track m+n is specified in the manner explained in the above-mentioned FIG. 32. For example, it is assumed that read or write is performed from the sector (A–2n–4). After the head reaches the sector (A–2n–4), access processing to the sector (A–2n–4) is performed. Next, when the sector (A–2n–3) and the following should be accessed, it can be known from defect management information (defect control information) prepared in advance in the apparatus that two consecutive sectors including the sector (A–2n–3) are defective sectors, and they are skip sectors assigned with substitutes. It is seen that this sector (A–2n–3) has a substitute sector on the track L, and accordingly, the sector in question on the track L is accessed. Finishing the skip processing, the access processing is returned to the sector (A–2n–1) and the following on the original track m+n. When the processing is finished until the sector (A–2n+1), it is seen from the defect management information that the sector (A–2n+2) should be subjected to slip processing. Accordingly, no processing is performed on this sector, moving to the next sector (A–2n+3). Thus, to perform defect processing, it is necessary to find information on a track that is to be currently accessed by the head, searching the defect management information prepared in advance.

As capacity of a disk apparatus becomes larger, the number of defective sectors per apparatus becomes larger. This causes deterioration of performance of the apparatus, since time for searching defect control information on the disk apparatus increases as the defect management information increases. As a measure against deterioration of performance, may be mentioned a technique disclosed in Japanese Unexamined Patent Laid-Open No. 11-7730. This conventional technique achieves high-speed defect processing, by preparing information that indicates existence of defects for each track, pointer information that indicates where is management information indicating defect sector information on the defective track corresponding to the above-mentioned information, and the management information mentioned.

SUMMARY OF THE INVENTION

According to the above-mentioned conventional technique, information is managed using three separate areas, i.e., an area that indicates the information on existence of defects for each track, an area that stores the pointer information indicating places where the actual defect control information corresponding to the above-mentioned information exists, and an area that stores the actual defect control information. Usually, these pieces of information are stored in a buffer area. Since three separate areas store these pieces of information, at least three accesses to the buffer area are required. The buffer is used for adjusting a data transfer rate between the host and the disk, or used as a cache, and used close to the limit of the buffer's performance in terms of the data transfer rate. Thus, it is undesirable to make many additional accesses to the buffer.

The area that stores the defect control information is necessary for defect control. The other areas, i.e., the area that indicates information on existence of defects for each track and the area that stores the pointer information indicating places where the actual defect control information are required for efficiently performing defect control. These other areas are not used for the actual defect control for a track to which the head accesses.

Further, as the capacity of the apparatus becomes larger, these two areas, i.e., the area that indicates the information on existence of defects and the area that stores the pointer information become larger. The conventional technique considers neither efficient buffer access nor a method of reducing the above-mentioned two areas.

Thus, an object of the present invention is to provide a disk apparatus that can efficiently perform defect control. Another object of the present invention is to provide a disk apparatus that can further reduce volume of control information.

To attain the above-mentioned objects, the present invention provides a disk apparatus in which a storage means stores pieces of defective track information, which each indicate existence of defective tracks for a group of a plurality of tracks, into storage areas at addresses corresponding to pieces of physical track number information. Further, the storage means stores pieces of defect information on defective tracks, in predetermined groups. Further, the storage means stores pieces of pointer information that indicate start addresses of the storage areas corresponding to the above-mentioned predetermined groups, respectively. When the processing means receives an instruction of read or write to a track of a storage medium, the processing means refers to a piece of defective track information based on the above-mentioned addresses. When existence of a defective track is indicated, the processing means refers to a piece of pointer information corresponding to the group relating to the referred piece of defective track information. Then, the processing means sequentially accesses the pieces of defect information from the storage area indicated by the above-mentioned piece of pointer information, to detect a piece of defect information of the track as the object of instruction. And, the processing means performs defect processing on the defective track based on the defect information detected.

BRIEF DESCRIPTION OF THE DRAWINGS

FIG. 1 is an explanatory diagram showing a method of accessing defect information in a disk apparatus according to one embodiment of the present invention;

FIG. 8 is an explanatory diagram showing information required for a defect element, in a disk apparatus according to one embodiment of the present invention;

FIG. 9 shows format diagrams (first) for a defect element in a disk apparatus according to one embodiment of the present invention;

FIG. 10 shows format diagrams (second) for a defect element in a disk apparatus according to one embodiment of the present invention;

FIG. 11 is a format diagram for control information in a disk apparatus according to one embodiment of the present invention;

FIG. 12 is a block diagram showing an electronic circuit of a disk apparatus according to one embodiment of the present invention;

FIG. 14 shows explanatory diagrams (TYPE1) for explaining apparatus capacity and defective track information storage capacity of a disk apparatus according to one embodiment of the present invention;

FIG. 15 shows explanatory diagrams (TYPE1) for explaining apparatus capacity and defect table information storage capacity of a disk apparatus according to one embodiment of the present invention;

FIG. 24 shows explanatory diagrams (TYPE2) for explaining apparatus capacity and defect table information storage capacity of a disk apparatus according to one embodiment of the present invention;

FIG. 25 shows explanatory diagrams (TYPE3) for explaining apparatus capacity and defect table information storage capacity of a disk apparatus according to one embodiment of the present invention;

FIG. 26 shows explanatory diagrams for comparing numbers of times of accessing a buffer until reaching a target defective track in a disk apparatus according to one embodiment of the present invention;

FIG. 29 is an explanatory diagram (TYPE4) showing an example of format of defect existence information for tracks in a disk apparatus according to one embodiment of the present invention;

FIG. 31 is a diagram for comparing various systems for a disk apparatus according to one embodiment of the present invention; and FIG. 32 is an explanatory diagram for explaining conversion from a host logical number to a disk physical number in a disk apparatus according to one embodiment of the present invention.

DETAILED DESCRIPTION

Now, an embodiment of the present invention will be described. The present embodiment will be described taking the case where a magnetic disk apparatus is used as a storage apparatus, and a magnetic disk as a storage medium.

Figure 13:
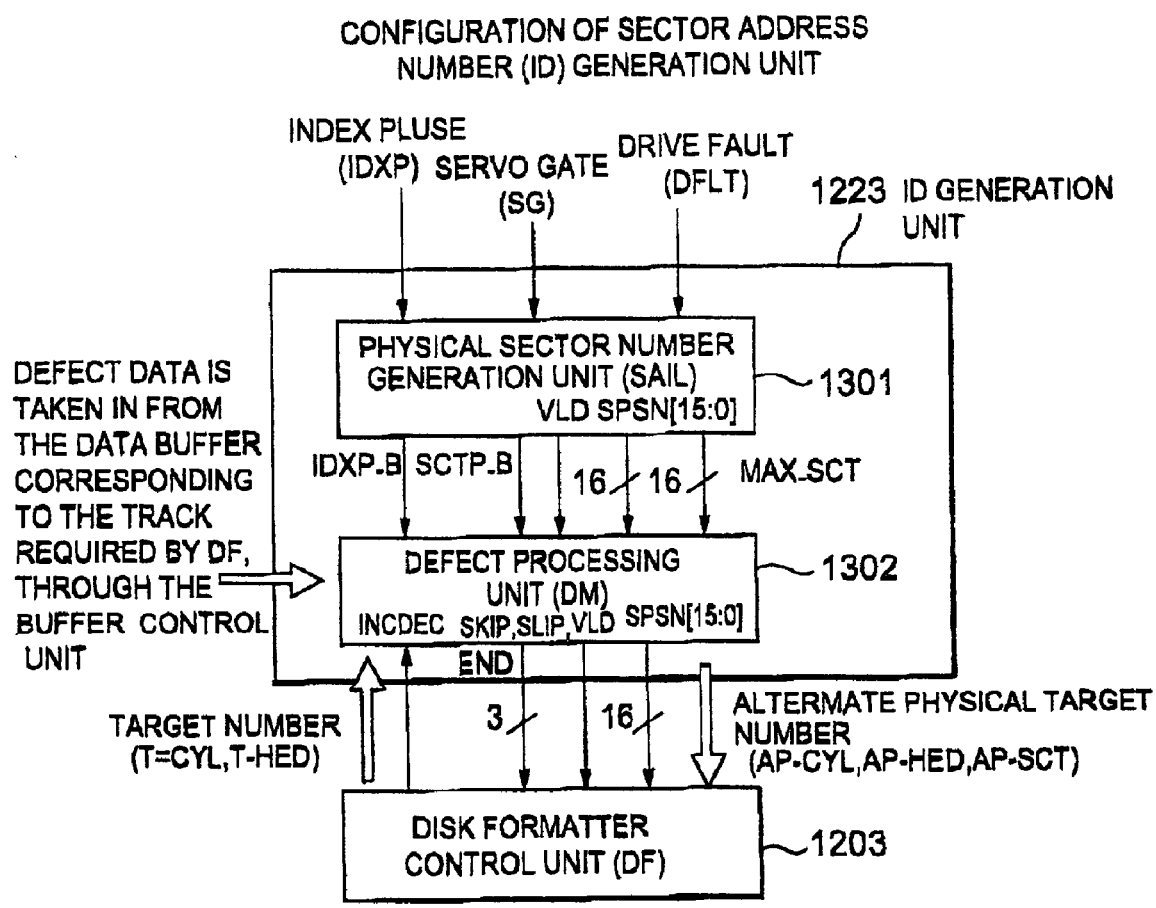
FIG. 13 is a block diagram showing a sector address number (ID) generation unit in a disk apparatus according to one embodiment of the present invention.

In the case where a magnetic disk apparatus is used as the storage apparatus and a magnetic disk as the storage medium in the present embodiment, a circuit configuration will be described. FIG. 12 shows a block diagram of the disk apparatus, and FIG. 13 shows a configuration of a control circuit inside the disk apparatus.

In FIG. 12, the disk apparatus 1212 comprises: an MPU 1205 for performing overall control; a data processing unit 1202 for sending and receiving data to and from a host computer; a data buffer 1209 for holding data such as defect management information for performing defect control; a flash memory FLASH 1215; an R/W circuit 1201 for performing read and write control; a mechanical unit for holding the magnetic disk; and a mechanism control unit 1211 for controlling the mechanical unit.

The mechanical unit 1214 comprises a magnetic head 122, a spindle motor 1216 for rotating the medium, and a VCM (Voice Coil Motor) 1215 for driving the magnetic head, and can hold the storage medium 1221.

The data processing unit 1202 comprises: an MPU I/F control unit 1204 as an interface with the MPU 1205; an ID generation unit 1223 for generating a sector address number; a host bus I/F control unit 1210 as an interface with the host computer 1213; a disk formatter control unit 1203 for controlling an interface of a disk drive and for controlling a disk format; a buffer management unit 1207 for controlling the buffer; and an ECC processing unit 1208 for performing error processing.

Referring to FIG. 12, operation at the time of standard data read will be described. In FIG. 12, will be considered the case where the disk apparatus 1212 and the host computer 1213 are connected with each other through a standard interface. First, the host computer 1213 sends a data read instruction to the disk apparatus 1212 according to an interface protocol. When the disk apparatus 1212 receives the command through the host bus I/F unit 1210 in the data processing unit 1202 of the disk apparatus 1212, then, the received command is sent to the MPU 1205. The MPU 1205 interprets this command, and starts operation of data read from the sector concerned of the drive. The MPU 1205 instructs the mechanism control unit 1211 to make it possible to read data from the sector in question in the mechanical unit 1214. The mechanism control unit 1211 reads a head position signal from the R/W circuit 1201 and controls the VCM 1215 in the mechanical unit 1214 to position the magnetic head 1222 at the track concerned on the medium 1221. Thus, the magnetic head 1222 reads the data.

Data in a servo area read from the medium 1221 is taken in as serial pulse data by the ID generation unit 1223 through the R/W circuit 1201. The ID generation unit 1223 performs byte sink detection, and performs serial-parallel conversion based on the results. As a matter of course, this operation may be performed by the R/W circuit 1201. Further, when the ID generation unit 1223 correctly reads a servo ID, the ID generation unit 1223 calculates a physical sector number from the value of the servo ID. Then, the ID generation unit 1223 performs logical operation after defect processing and delivers a logical sector number to the disk formatter control unit 1203, thus performing an ID-less processing. Here, in the ID-less processing, a number for specifying a data sector is not specified by a data sector ID area stored, in the medium, before a data sector, but the data sector number is specified on a circuit by a servo sector number. Nowadays this is widely applied in a disk apparatus. Specifically, the circuit of the disk apparatus specifies a servo sector number stored in a servo sector area or a servo sector number from a servo sector having an index mark, one of which exists every one turn of a disk. This servo sector is followed by data sector format or data sector number information of data sector area, which is stored in the disk apparatus in a manner to be handled on the circuit with the servo sector number as an argument. Accordingly, the data sector number can be specified from the servo sector number, even though the data sector ID area does not exist on the disk. The foregoing is an outline of the ID-less processing. In accordance with this ID-less processing, it is judged if the sector in question is the desired sector. Then, when it is the desired sector, data is read through the R/W circuit 1201. The R/W circuit 1201 converts an analog signal into an NRZ (Non Return to Zero) signal. This NRZ signal is taken in by the disk formatter control unit 1203 in the data processing unit 1202.

Next, the disk formatter control unit 1203 sends the read data to the ECC processing unit 1208 and to the data buffer 1209 through the buffer management unit (BM) 1207. When the disk formatter control unit 1203 receives a report from the ECC processing unit to the effect that no error has generated, then, the disk formatter control unit 1203 causes the data, which is stored in the data buffer 1209, to be transferred to the host computer 1213 through the host bus interface control unit 1210.

The ID generation unit 1223 performs defect control efficiently. FIG. 13 shows a detailed configuration of the ID generation unit. In FIG. 13, the ID generation unit 1223 comprises a physical sector number generation unit 1301 for generating a physical sector number, and a defect processing unit 1302 for performing defect processing.

From the MPU 1205, the physical sector number generation unit 1301 receives a servo gate (SG), which is read from the medium and used for positioning the head, an index pulse (IDXP), which expresses the top of the track, and a drive fault (DFLT) signal, which urgently advises that head positioning control has failed. Then, using the current sector format information, the physical sector number generation unit 1301 generates a physical sector number for the case where no defect exists, and sends the generated physical sector number to the defect processing unit 1302.

The defect processing unit 1302 informs the disk formatter control unit 1203 of the target physical sector number SPSN[15:0] (Skewed Physical Sector Number) to which access is desired. Here, when the desired target physical sector is a current defective sector, the defect processing unit instructs alternate Physical Target Number, which is a substitute destination. Further, the defect processing unit 1302 inquires of the buffer management unit (BM) 1207 if there exists defect information on the track corresponding to the target physical track number, to search for defect management information stored in advance in the buffer 1209. When it is found that the track to be accessed is defective, then, the defect processing unit 1302 obtains the defect table information required for the defect control, from the data buffer 1209 through the buffer control unit 1207. And, the defect processing unit 1302 performs defect control processing based on the physical number generated by the physical sector number generation unit. Based on the results, the defect processing unit 1302 informs the disk formatter control unit 1203 of the required control information such as the kind (a skip sector or a slip sector) of the sector over which the head is currently passing, the sector number, a sector pulse indicating the top of the sector, and the like.

Figure 2:
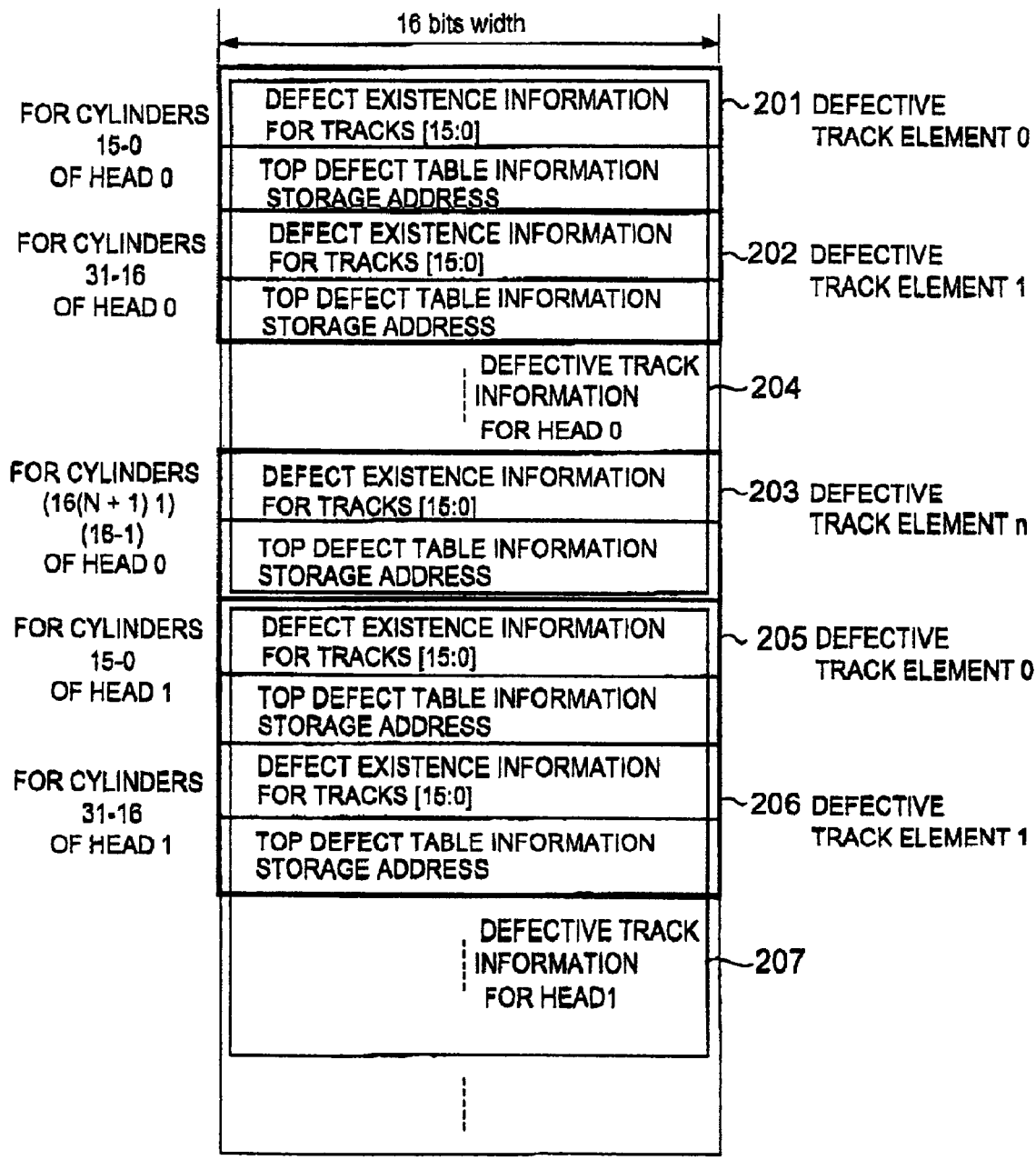
FIG. 2 is a format diagram (TYPE1) for a defective track information storage area in a disk apparatus according to one embodiment of the present invention.
Figure 3:
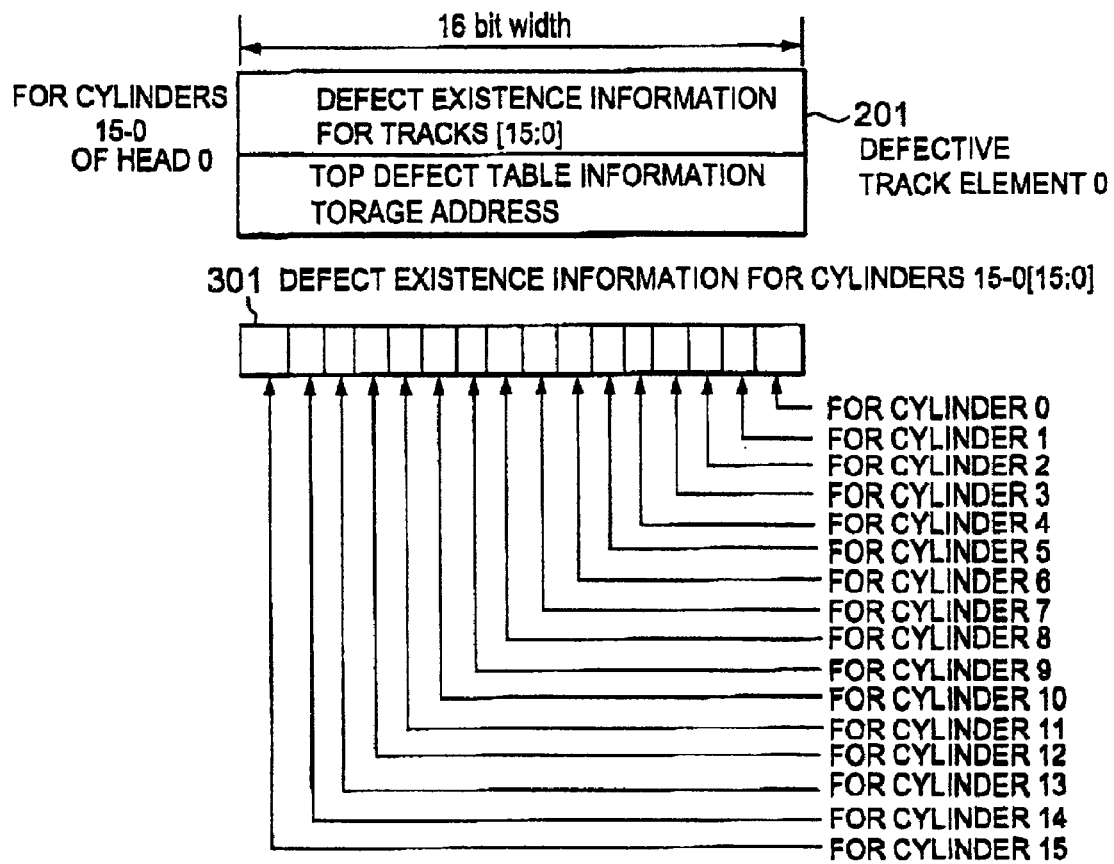
FIG. 3 is an explanatory diagram (TYPE1) showing an example of format of a defective track element for tracks in a disk apparatus according to one embodiment of the present invention.
Figure 4:
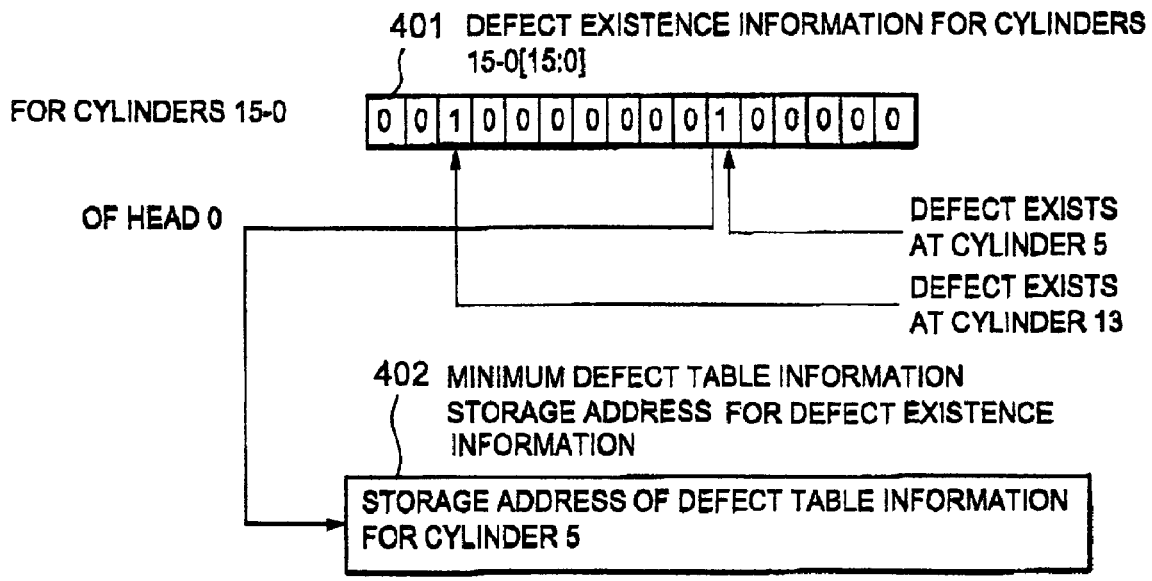
FIG. 4 is an explanatory diagram (TYPE1) showing an example of format of defect table information storage address in a disk apparatus according to one embodiment of the present invention.

Next, a method of accessing defect information in the defect processing unit 1302 of the disk apparatus 1212 will be described in detail. FIG. 1 is an explanatory diagram showing a method of accessing defect information. FIGS. 2, 3 and 4 are explanatory diagrams showing a format of a defective track information storage area and its details.

In the present embodiment, the defective track information is stored into pairs of an area for defect existence information and an area for its corresponding pointer information, those pieces of information being required for efficient defect control. Further, the defect existence information is expressed for groups of n tracks (n is a selectable integer more than or equal to 1). Further, each piece of the pointer information is expressed as an offset from a base address whose argument is a track accessed by the head.

FIG. 1 shows, in the disk apparatus 1212, an example of processing performed after the MPU 1205 calculates a physical number to be actually accessed by the head, from a logical number given by the host. In FIG. 1, this physical number is decided as shown as the disk physical CHS number 101. This physical CHS number consists of a disk physical head number 102, a disk physical cylinder number 103 and a disk physical sector number 104. A pair of the disk physical head number and the disk physical cylinder number can specify the track as an object of current access. This pair is shown as the target address 106. The disk apparatus is provided with a buffer 107. The buffer 107 has a defective track information storage area 108 that stores information (defect existence information for tracks) indicating existence of defects for physical tracks and stores a pointer (storage address for the top defect table information) pointing to the top area that stores information required for performing defect control on the track concerned. Further, the buffer 107 has a defect table information storage area 112 for storing information required for performing defect control. The defect table information storage area 112 stores information in order of defective track's number. The top defect table information storage address indicates a top address in the defect table information storage area 112. The defect table information storage area 112 stores a cylinder number, a head number, a byte count of stored information, and a kind of processing skipping or slipping as defect information in the track), in order of defective track's number.

In FIG. 1, the base address 105 of the defective track information storage area is written as BASEα. The defective track information storage area is arranged such that this information BASEα together with the target address 106, which is calculated from the track that the head is to access, can specify the reference destination in the defective track information storage area, to check existence of defects in the track in question. In FIG. 1, each defect existence information indicates existence information for sixteen tracks. With respect to a defective track having the smallest number among the sixteen tracks, the corresponding storage address in the defect table information storage area is stored as the top defect table storage address. When a defect is found in a track accessed by the head, then, owing to this format, the ID generation unit 1223 can detect a storage location of the appropriate required defect table information 113 in the defect table information storage area, based on a base address BASEα 111 of the buffer area in which the defect table information is stored and the top defect table storage address stored in the defective track information storage area.

In the present embodiment, among defective tracks in the sixteen tracks, only the top defect table storage address of the top defective track is stored. With respect to the other defective tracks than the top defective track, their respective pieces of defect table information are stored from the address adjacent to the top defect table storage address and in ascending order of track number. Accordingly, those pieces of defect table information can be found by sequentially accessing the defect table information. Since these pieces of information are stored in order of track number of defective track, it does not happen to search all over the buffer for a long time.

FIG. 2 shows a detailed format of the above-described defective track information storage area 108.

In FIG. 2, the defective track information storage area 108 stores defective track information in order of head number, i.e., defective track information 204 for a head 0, defective track information 207 for a head 1, and so on. Defective track information for each head contains defective track elements for groups of sixteen tracks. For the head 0, there exist a defective track element 0 201, a defective track element 1 202, . . . , and a defective track element n. For the head 1 , de track elements are constituted by a defective track element 0 205, a defective track element 1 206, . . . . Each track element consists of defect existence information for tracks and a top defect table information storage address. Here, the top defect table information storage address is a storage address of defect table information of the defective track having the smallest track number among the defective tracks indicated in the defect existence information.

FIG. 3 shows an example of a format of a defective track element for tracks. As previously described, the defective track element 0 201 has the defect existence information for tracks and the top defect table information storage address. Here, each bit of the defect existence information 301 for tracks indicate whether a defect exist in cylinder 15–0 for the head 0. A bit is set to 1 when the corresponding track has a defect. When there are a plurality of defects in the cylinders 15–0, i.e., when 1 is set to a plurality of bits, then, the address that stores defect table information of the smallest track number is stored as the top defect table information storage address.

FIG. 4 shows an example of the defect table information storage address of a defective track element. In FIG. 4, the bits show defect existence information for the cylinders 0–15 respectively, in sequence from the bit on the right end. In the case shown, defects exist in the cylinders 5 and 13 of the head 0. And, as the defect information storage address 402, is stored the address referring to defect table information used for controlling the defect in the cylinder 5 of the head 0.

Figure 5:
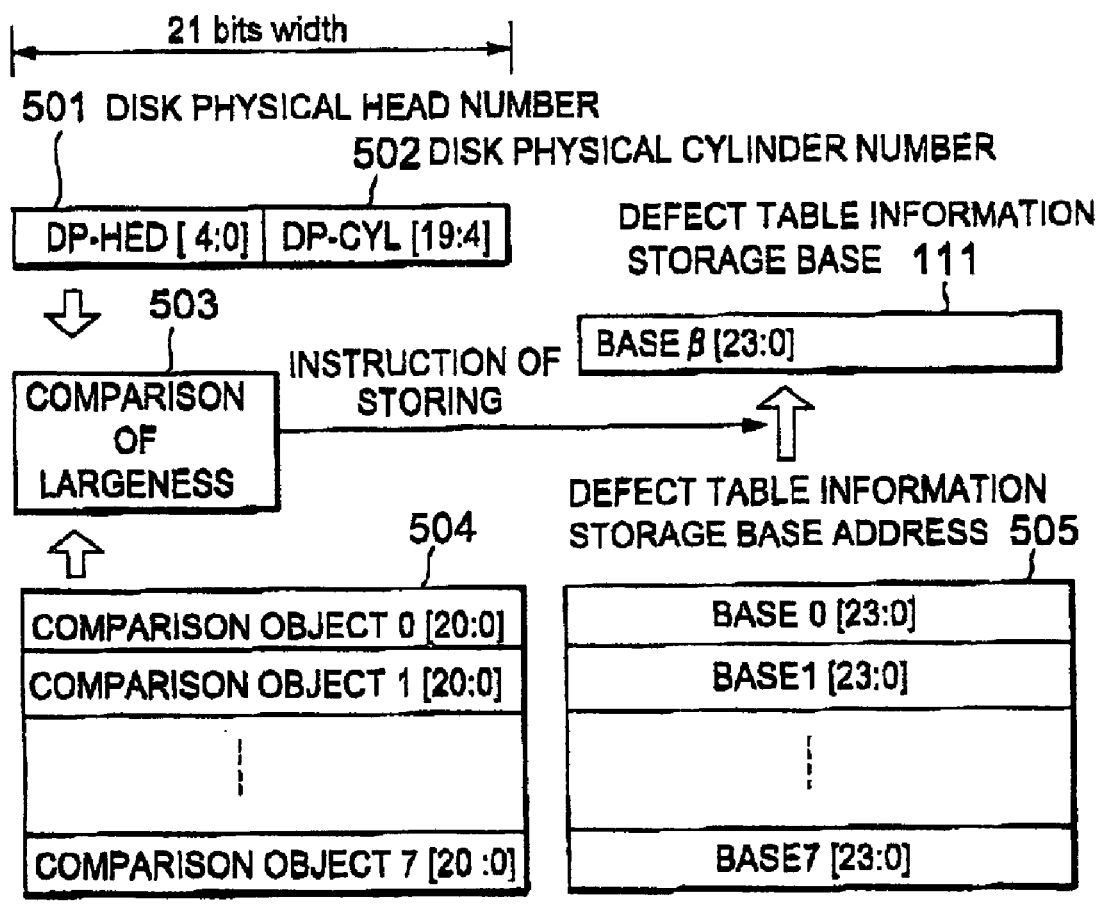
FIG. 5 is a defect table information storage address base selection diagram for a disk apparatus of one embodiment according to one embodiment of the present invention.

Next, a method of selecting a base address for the defect table information storage area will be described. FIG. 5 is a diagram for explaining a method of selecting a base address for the defect table information storage area.

In FIG. 5, a track accessed by the head can be specified by a disk physical head number 501 and a disk physical cylinder number 502. The ID generation unit 1223 judges if the track in question has defects, based on the disk physical head number and the disk physical cylinder number, and referring to the defect existence information 401 shown in FIG. 4. When there exists a defect, the defect table information storage address 402 is referred to. The defect table information storage address 402 has a bit width that can express all the addresses of the buffer space where the data is stored. For example, when the buffer is 32 MB, the defect table information storage 402 has a 24-bit width. In the present embodiment, in order to narrow the range of the storage addresses in the buffer, the bit width of the defective track information storage address 402 is further reduced. To that end, address ranges are provided so that the each address range can be expressed by a disk physical head number and a disk physical cylinder number, while providing in advance a comparison object register 504 and defect table information storage base addresses 505 of the corresponding buffer areas. In the present embodiment, the table information storage area is partitioned into groups according to track numbers, and a starting location of each group is expressed by a base address. This grouping is performed by comparison with addresses of comparison objects.

Figure 20:
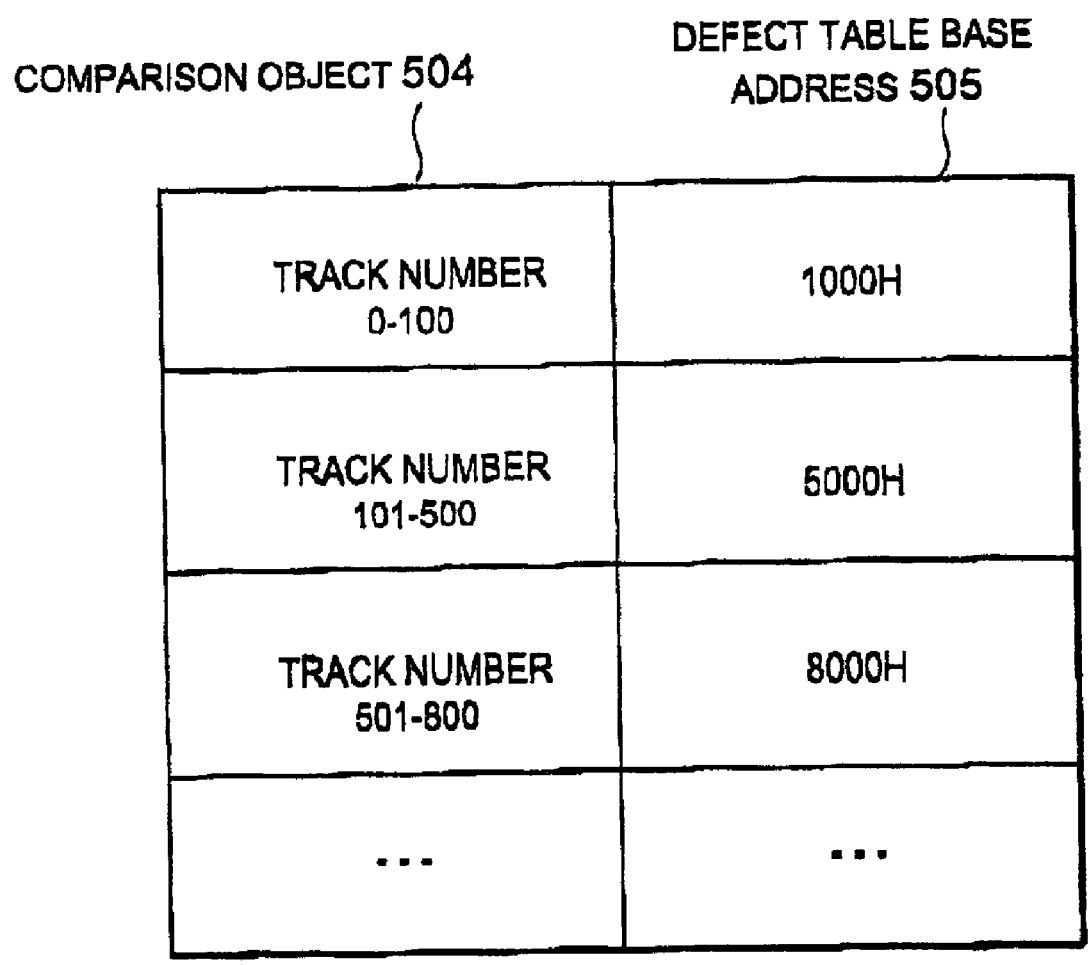
FIG. 20 is an explanatory diagram showing examples of a comparison object register 504 and a defect table information storage base address 505 of a buffer corresponding to the comparison object.

FIG. 20 shows an example of the comparison object register 504 and the defect table information storage base addresses 505 of the corresponding buffer areas. As shown in FIG. 20, each group of track numbers is set as a comparison object. Further, correspondingly to each group, a defect table information storage base address 505 is set. Magnitude comparison 503 is performed for judging which range of comparison object contains the address in question, which is expressed by the disk physical number and disk physical cylinder number accessed by the head. The defect table information storage base address corresponding to the group found from the magnitude comparison is substituted into the defect table information storage base address 111. By this arrangement, the top defect table information storage address (which is an item in a defective track element in the defective track information) does not require the bit width corresponding to the bus width of the buffer that stores the defect table information. Thus, buffer memory used for the defective track information can be suppressed. According to the above-described method, it is possible to reduce defective track information that is prepared for efficiently searching for appropriate defect table information, thus realizing a sector address generation device for a disk apparatus, which can reduce buffer capacity.

Figure 6:
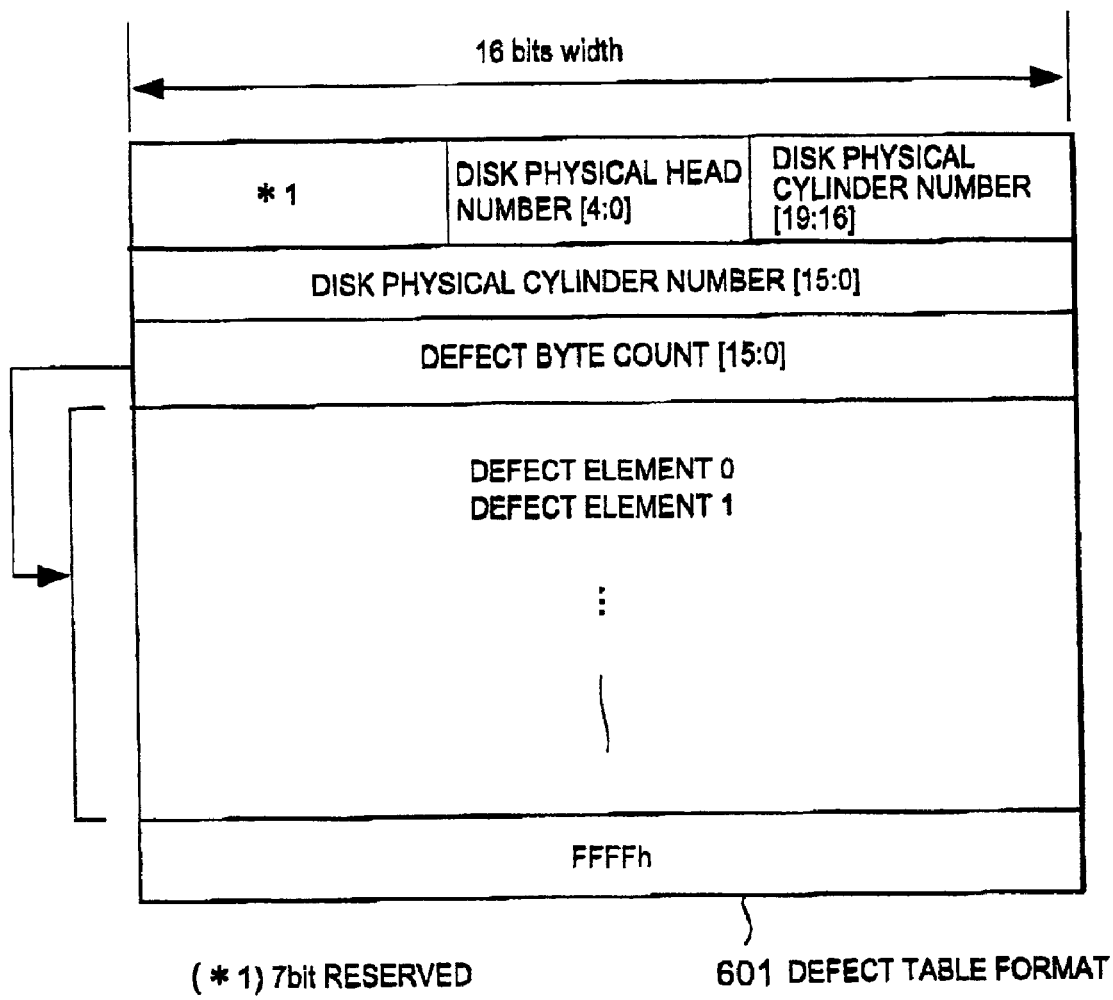
FIG. 6 is a format diagram (TYPE1) for a defect table information storage area in a disk apparatus according to one embodiment of the present invention.
Figure 7:
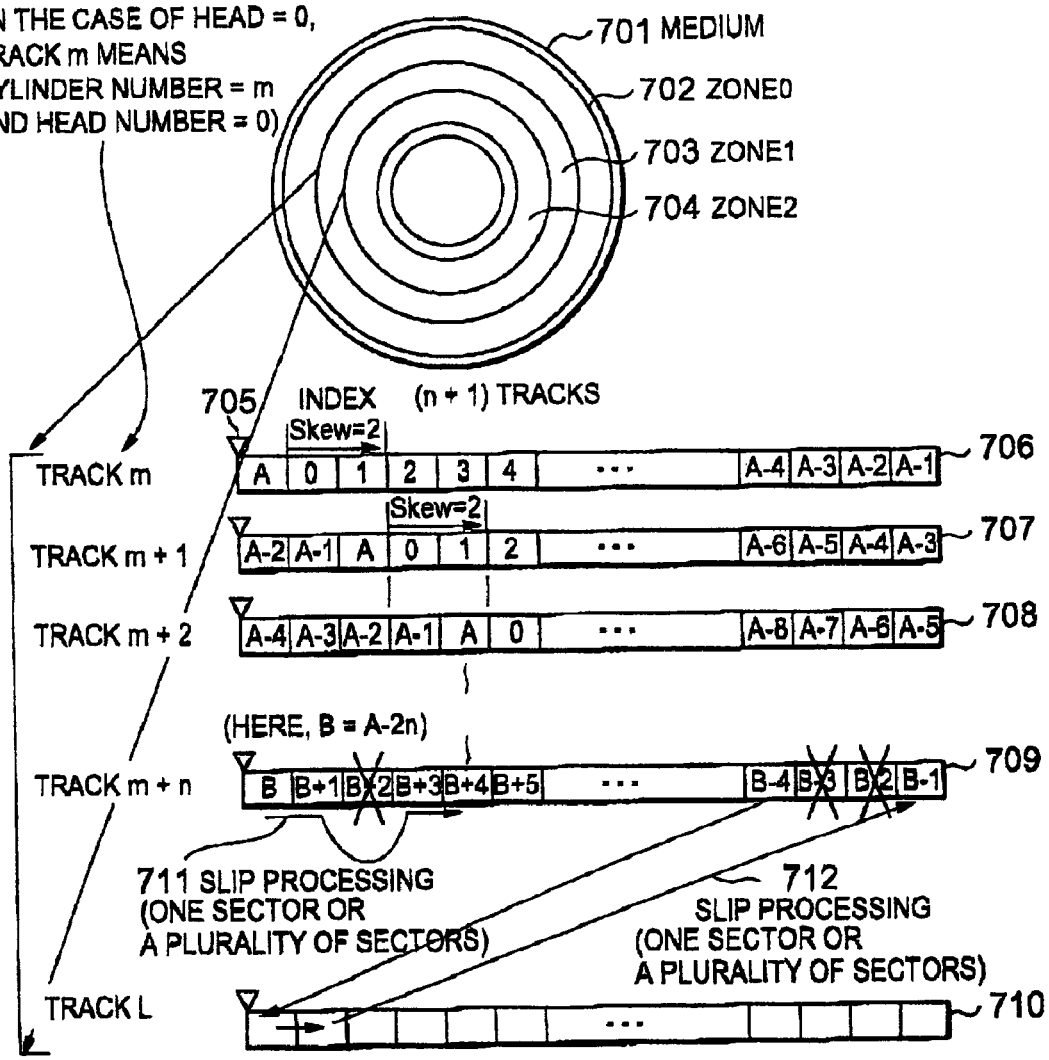
FIG. 7 is a sector allocation map that includes defects of a disk apparatus according to one embodiment of the present invention.

Next, the defect table information storage area will be described. FIG. 6 shows a format of the defect table information storage area used for controlling defects. FIG. 6 shows a defect table format 601 for one track, and the format includes a disk physical head number and a disk physical cylinder number. Further, the format includes a defect byte count, which indicates largeness (the number of bytes) of defect information for one track, and defect elements (skip information, slip information, and the like) each indicating defect information for each sector. Instead of the defect byte count, a predetermined code (FFFFh in the figure) or the like may be placed to indicate a boundary of the defect table information for one track. This can make control by hardware easy.

Next, FIG. 8 shows details of a defect element. As shown in FIG. 8, as a defect element, there are skip information for instructing skip, slip information for instructing slip, end physical sector information indicating the end physical sector number among the usable (non-defective) sectors, and the like. By managing these pieces of information in terms of physical sector numbers from a physical index position, these pieces of information are not affected by change of a skew value. And thus, it is not necessary to change the defect element information even if the track format is changed.

FIGS. 9 and 10 shows defect element formats in detail. FIG. 9(1) shows a skip format for one sector only. FIG. 9(2) a skip format for two or more continuous sectors. FIG. 10(3) a slip format for one sector only. FIG. 10(4) a slip format for two or more continuous sectors. FIG. 10(5) a format for the end sector in the track concerned, and FIG. 10(6) is a format for a boundary of the defect table. FIG. 11 shows details of CTRL. This CTRL is control information for identifying each format.

In FIGS. 9 and 10, AP-HD (Alternate Physical Head), AP-CYL (Alternate Physical Cylinder), AP-SCT (Alternate Physical Sector) indicates a physical head number, a physical cylinder number and a physical index base sector number of a substitute, respectively. DP-SCT (Defective Physical Sector) indicates a physical index base sector number where a defect has currently occurred. DP-SCTCNT (Defective Physical Sector Count) indicates the number of continuous defective sectors. EP-SCT (End of Physical Sector) indicates the physical index base sector number of the end sector among the effective sectors in the track concerned. Using these formats, each defect element can be specified. For example, when one sector skip is to be expressed according to FIG. 9(1), "1" is set to CTRL[5] and "0" is set to CTRL[4]. Further, a substitute sector is specified by AP-HD, AP-CYL and AP-SCT. Further, DP-SCT indicates a sector number of a defective sector.

FIGS. 14 and 15 show an example of trial calculation of buffer capacity required for the defective track information and buffer capacity required for the defect table information of the disk apparatus according to the present embodiment. In particular, FIG. 15 shows calculations in the case where the defect occurrence rate is on the level of an ordinary apparatus, i.e., 0.1% to the capacity of the apparatus, and in the case where the rate is tenfold, i.e., 1%.

In FIG. 14, the horizontal axis indicates a disk capacity of the disk apparatus, and the vertical axis indicates buffer capacity required for holding the defective track information. For example, when the capacity of the disk apparatus is 20 GB and the number of track sectors is 512 sectors/track, then, in the present embodiment, the defective track information storage area requires 19.1 KB, since existence of defective sectors is indicated for each track (16 bits-16 tracks), requiring length of 4 bytes for 16 tracks.

Further, in FIG. 15, the horizontal axis indicates disk capacity of the disk apparatus, and the vertical axis indicates buffer capacity required for holding the defect table information. The control rate indicates a rate of the defective sectors to the number of all sectors in the disk. For example, when the capacity of the disk apparatus is 20 GB, the number of sectors is 39 M sectors, and the control rate is 0.1%, then, the number of defective sectors is 39 K sectors, and the storage capacity for the defect table information becomes 625 KB, since one defective sector requires 16 byte.

From these results, it is found that even when the buffer capacity of the disk apparatus is on the level of about 32 MB, it can sufficiently store the information in the case where the defect occurrence rate is on the level of an ordinary apparatus. From the above discussion, it is found that an efficient sector address generation apparatus for a disk apparatus can be realized without increasing buffer capacity for the defect table information concerned. For the sake of convenience, the above-described format for defect control information is referred to Type 1 hereinafter.

Next, a second embodiment will be described in detail taking an example where the embodiment is applied to the same magnetic disk apparatus and the magnetic disk shown in FIGS. 12 and 13. The present embodiment takes an example where the defective track information is not provided, and the defect processing unit 1302 performs defect control using defect table information only. Lengths (i.e., capacities) of defect elements for respective tracks are various. Thus, in the present embodiment, a fixed length part of table information, which indicates a physical address of a defective track, and a defect element having a variable length are held separately.

Figure 18:
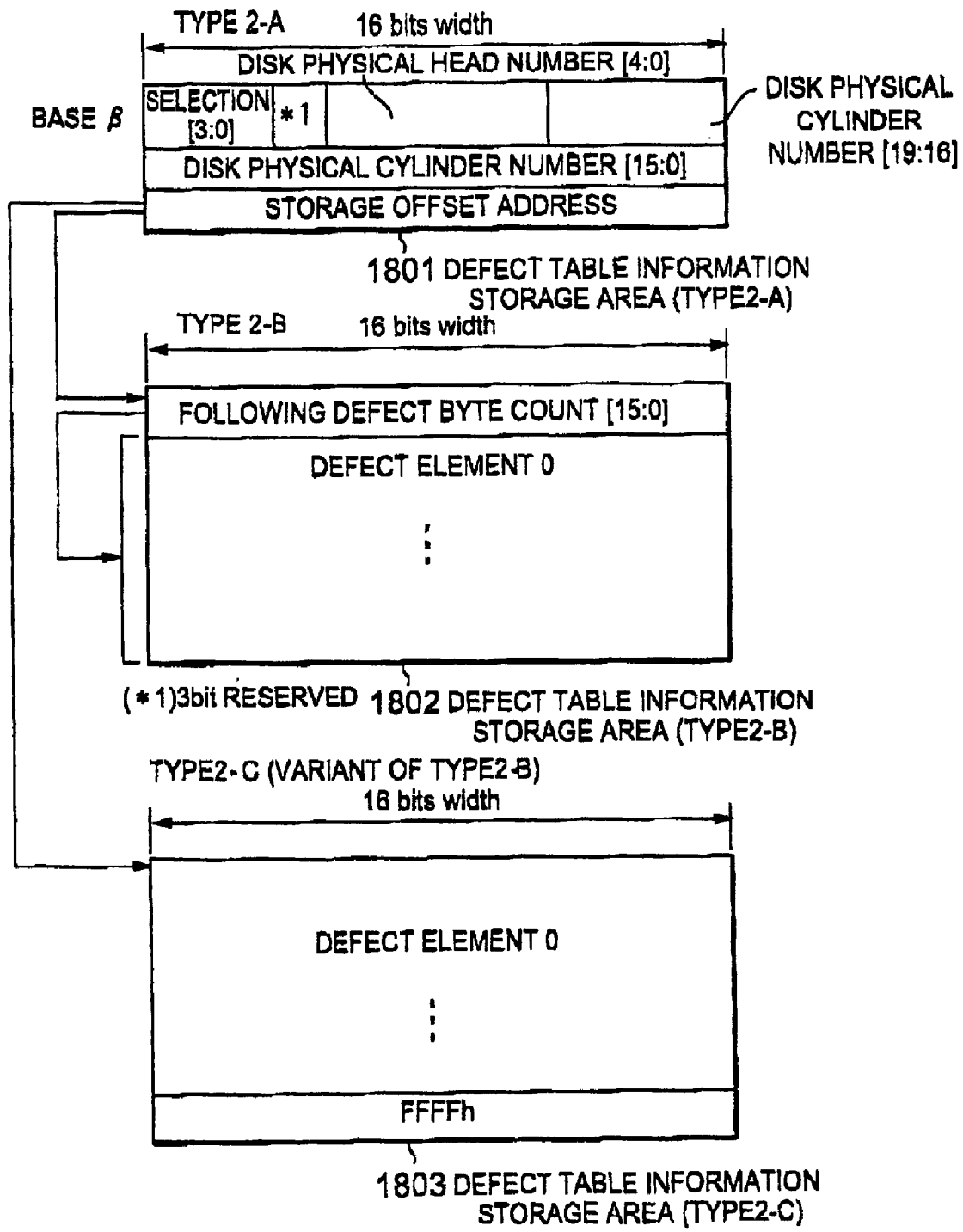
FIG. 18 is an explanatory diagram (TYPE2) for explaining a format of a defect information storage area in a disk apparatus according to one embodiment of the present invention.
Figure 21:
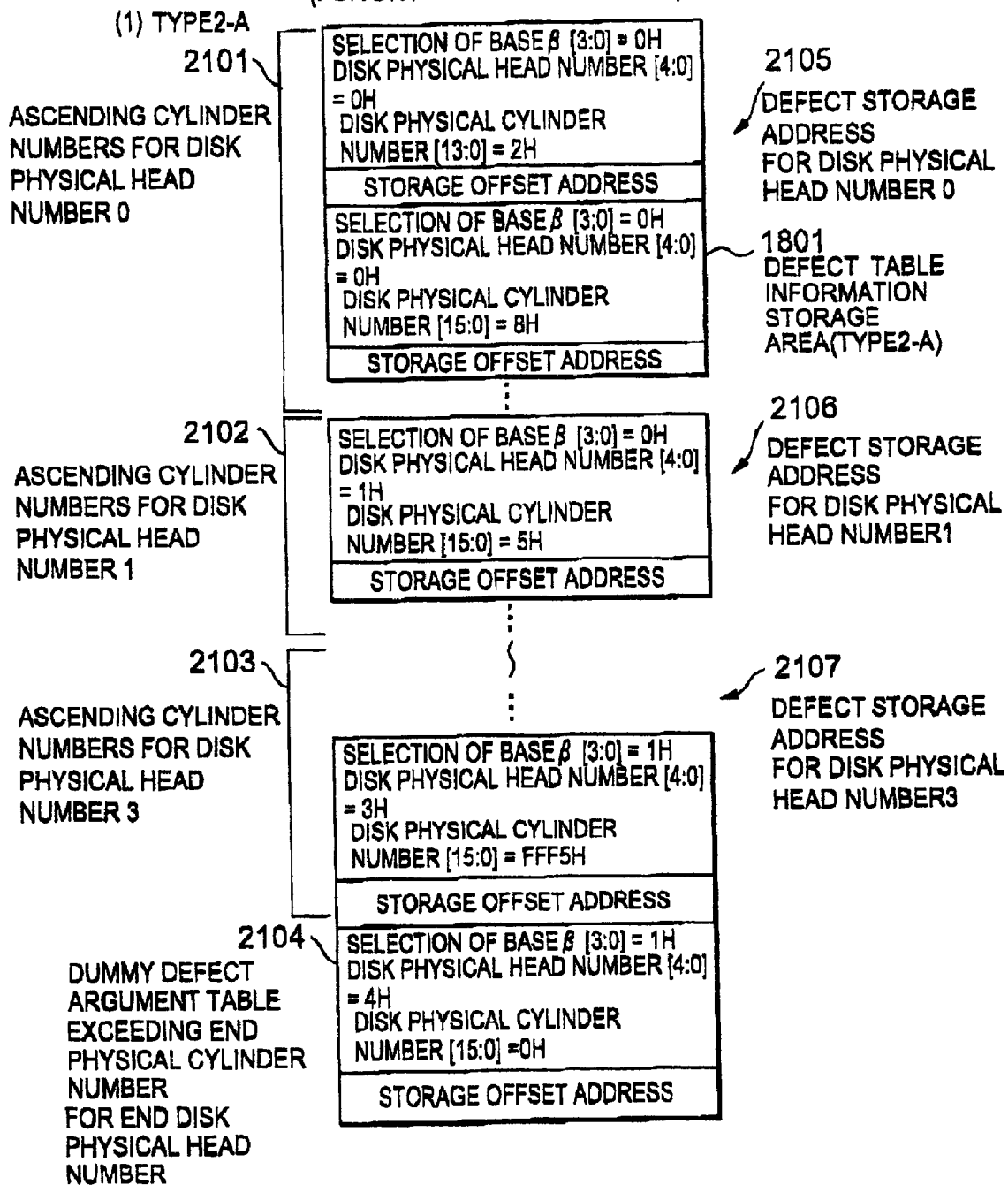
FIG. 21 is an explanatory diagram (TYPE2-A) for explaining a defective track information storage format in a disk apparatus according to one embodiment of the present invention.
Figure 22:
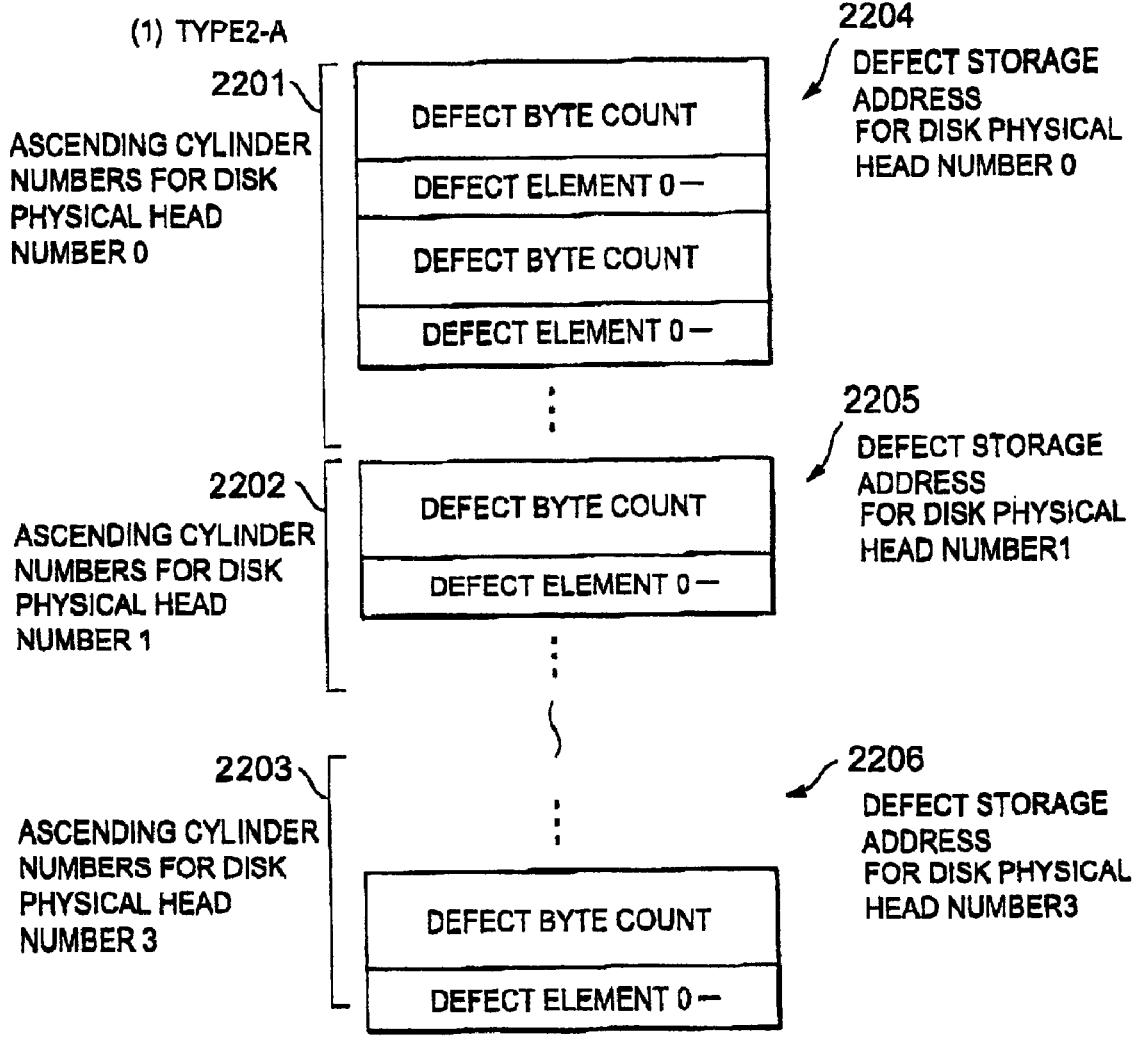
FIG. 22 is an explanatory diagram (TYPE2-B) for explaining a defective track information storage format in a disk apparatus according to one embodiment of the present invention.

An example of a format for a defect table information storage area is shown in FIG. 18. Further, an example of storing in the buffer is shown in FIGS. 21 and 22.

In FIG. 18, a defect table information storage area 1801, which is the part indicating a physical address of a track, contains a disk physical head number, a disk physical cylinder number, and a storage offset address indicating a storage address of a defect element. Defect table information storage areas 1801 are stored in the data buffer, in order of cylinder number of defective track. Further, a storage area 1802 or 1803 for a defect element as a variable length part, is located at the defect element storage address. The defect processing unit 1302 shown in FIG. 13 sequentially searches for parts of the defect table information, which indicate physical addresses of tracks, in order to know if a defect exists in the track concerned. When a defective track does not exist, a predetermined value is set for indicating that there is no defective track. By separately holding a track number (a disk physical head number and a disk physical cylinder number) and a corresponding defect element, a track number of a fixed length can be searched for without depending on capacity of a defect element of each track, making search by hardware easy.

Further, in the present embodiment, by partitioning the area for storing defect elements, and by preparing a base address for each partitioned area, with selection of a partitioned area being indicated by a selection bit in the defect table information, it is possible to shift a storage location by a base address, and to cope with insufficiency of bits.

Further, as shown in TYPE2-B, in order to know a boundary of a defect table element for each track, it is possible to provide an area for a defect byte count at the top of a defect element. Or, a special code (FFFFh in FIG. 18) indicating a boundary of a defect table element may be provided.

In FIG. 21, "0" is selected as BASEβ (BASEβ=0) from the defect table information 2101 for the disk physical head number 10 to the defect table information 2102 for the disk physical head number 1, selecting the base 0 of the defect table information storage address. In the case of the defect table information 2103 for the disk physical head number 3, a new base address is provided by setting BASEβ to "1" (BASEβ=1), to shift the base address to cope with deficiency of the storage space for defect elements. Thus, although the width of the storage offset address is limited to 16 bits, the buffer space can be used effectively. Further, the storage offset address does not need to have a bit width corresponding to the buffer space (for example, 25 bit width for 32 MB of buffer space), and it is not necessary to have an excessively large storage area for the defect table information.

Further, the defect table information 2104 for the end disk physical head number is a dummy. By setting a number that exceeds a track to be accessed by the head, the defect management architecture can be maintained as it is. This makes hardware implementation easy.

In FIG. 21, the defect table information storage area has a storage area for each track number, and its address can be indicated as a defect argument storage address. Namely, there does not exists the defective track information that includes the defect existence information for all the tracks as shown in the first embodiment, the area is partitioned utilizing a track number (a disk physical head number and a disk physical cylinder number) to which the head is to access.

In FIG. 21, the defect argument storage address 2105 for the disk physical head number 0, the defect argument storage address 2106 for the disk physical head number 1 and the defect argument storage address 2107 for the disk physical head number 3 show respective storage addresses corresponding to disk physical head numbers. The defect processing unit 1302 shown in FIG. 13 searches the defect table information where defective tracks only are collected, to judge if the track to access is defective. Each piece of defect table information is stored in ascending order of the cylinder number of the defective track, and has a fixed size, thus making hardware search easy.

FIG. 22 shows an example of the defective elements of the defect table information shown in FIG. 18. As shown in FIG. 22, the present embodiment can be realized only by track numbers of defective tracks and defect elements that do not include a track number. Thus, the defective track information can be deleted, and the buffer capacity can be decreased in comparison with the case where the defective track information is included. Similarly, the case of TYPE2-C in FIG. 18 can reduce the buffer capacity. Here, this format type is referred to as TYPE2 in the following, as shown in FIG. 18 for the sake of convenience.

Next, a third embodiment will be described in detail, similarly taking an example where the embodiment is applied to the magnetic disk apparatus and the magnetic disk shown in FIGS. 12 and 13. In the present embodiment, the defective track number (the disk physical head number and the disk physical cylinder number) and the defective elements, which have been described in TYPE 2, are managed without separating them. In this case, data of the defect table offset address, which is shown in TYPE2 and relates the defective track information and the defect table information, is unnecessary, and thus, the buffer capacity can be made minimum. Further, update of an offset address owing to addition of a defect element is not required, and accordingly, this has the merit of reducing operation load on the MPU of the disk apparatus for which defect information is managed.

Figure 19:
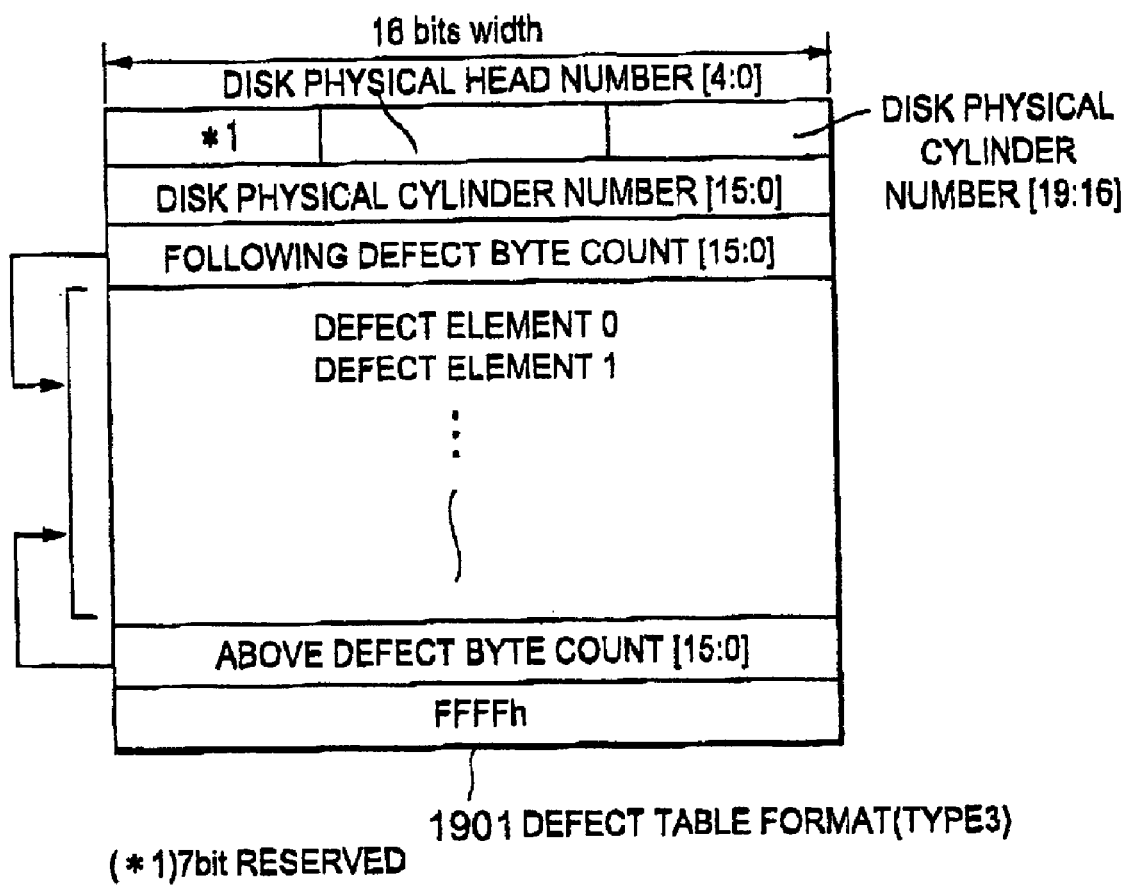
FIG. 19 is an explanatory diagram (TYPE3) for explaining a format of a defect information storage area in a disk apparatus according to one embodiment of the present invention.
Figure 23:
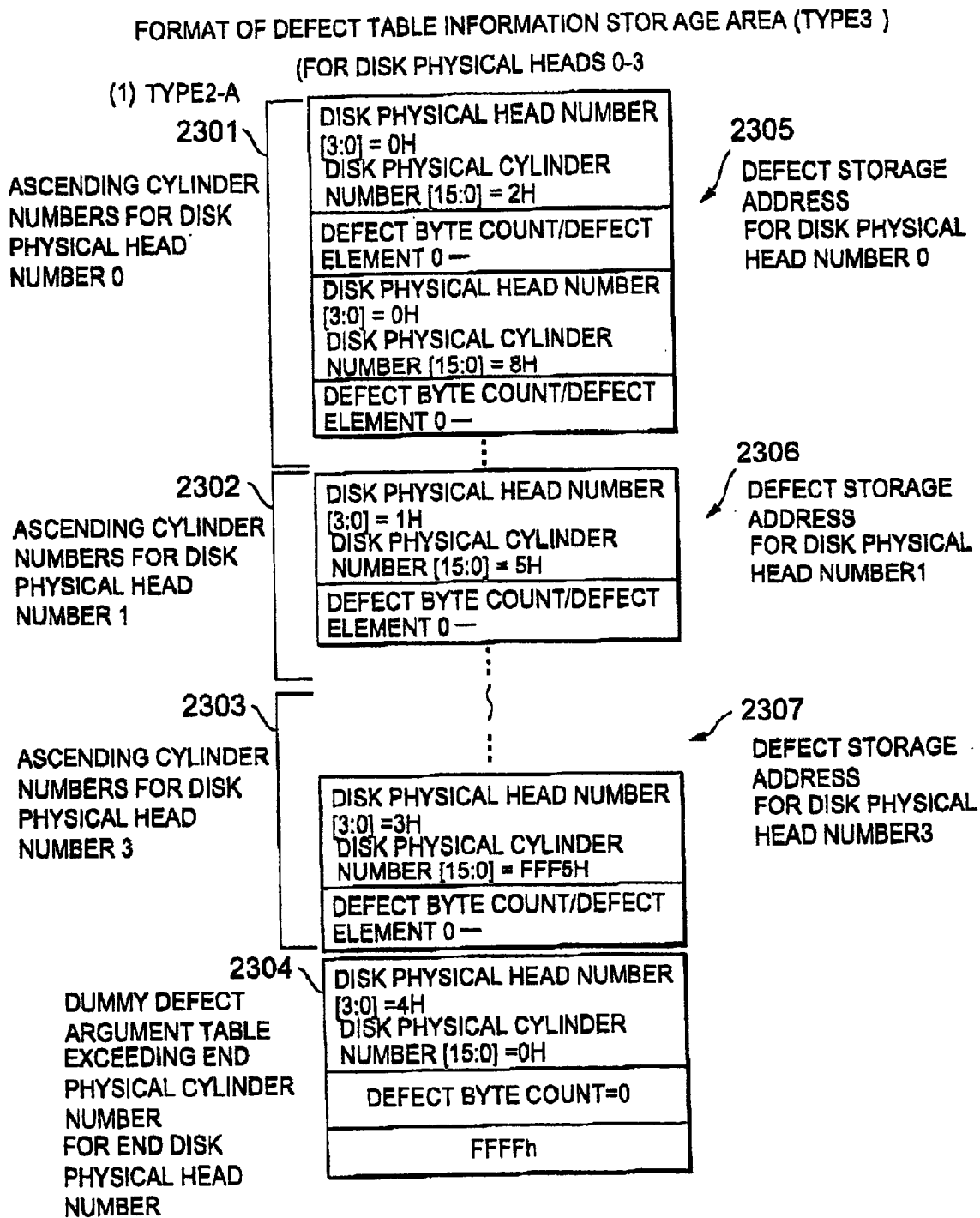
FIG. 23 is an explanatory diagram (TYPE3) for explaining a defective track information storage format in a disk apparatus according to one embodiment of the present invention.

FIGS. 19 and 23 show the defect table information storage format in the present embodiment. In FIG. 19, a defect table information storage area 1901, which is a part showing a physical address of a track, has a defect physical head number, a disk physical cylinder number, a defect byte count, defective elements, and a defect byte count. Defect table information storage areas 1901 are stored in the data buffer in order of cylinder number of defective track. The defect processing unit 1302 shown in FIG. 13 sequentially searches only the parts indicating physical addresses of tracks in the defect table information, in order to know if a defect exists in the track concerned.

Further, in FIG. 23, similarly to FIG. 21, the defect table information 2301 for the disk physical head number 0, the defect table information 2302 for the disk physical head number 1 and the defect table information 2303 for the disk physical head number 3 are stored in order physical cylinder number of defective track. Further, there is provided a dummy defect table 2304 that indicates values exceeding the end disk physical head number and the end physical cylinder number. The defect processing unit 1302 retains access addresses of the defect table, and prepares for the next access to the adjacent track by comparing the largeness of the number of the track to access and the defective track numbers. Thus, owing to the dummy defect table 2304 where the track number exceeds the maximum track number, access does not proceed exceeding the dummy table.

Accordingly, control architecture is unified, and implementation of the control mechanism is easy. Further, in the present embodiment, the defect storage addresses 2305, 2306 and 2307 for disk physical head numbers corresponding to physical head numbers do not have the defective track information. Accordingly, by selecting a defect storage address for a disk physical head number corresponding to a physical head number that the head is to access, a search time for the track concerned can be shortened. Thus, as described above, defect control information can be made of the defect table information only, so that the defective track information can be deleted, in contrast with the case where the defective track information exists, and the buffer capacity can be reduced. Here, for the sake of convenience, the format type shown in FIG. 19 is referred to as TYPE3 in the following.

Figure 16:
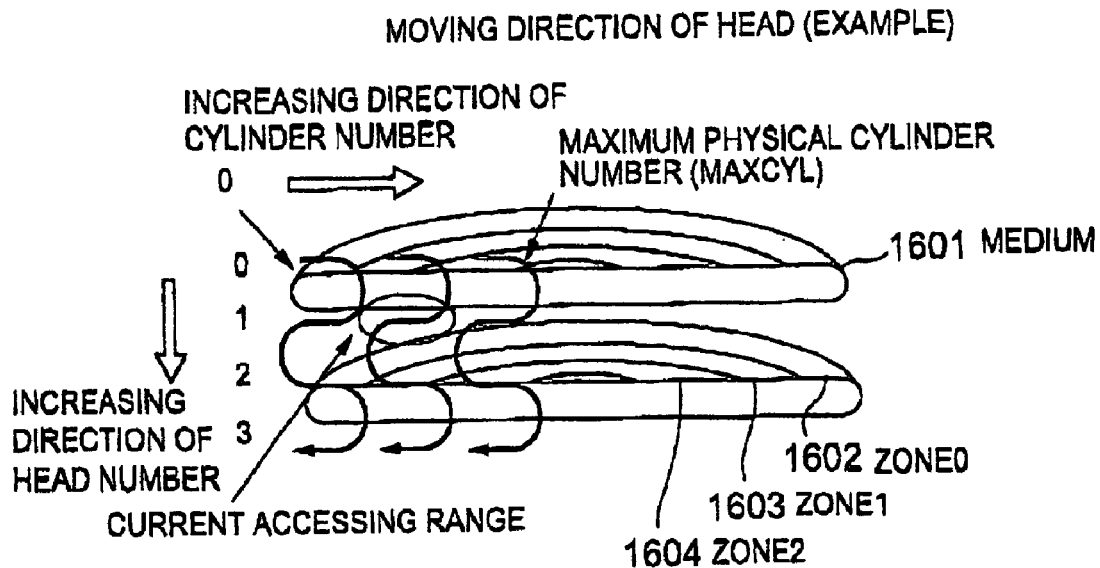
FIG. 16 is an explanatory diagram for explaining (in an example) moving directions of a head of a disk apparatus according to one embodiment of the present invention.
Figure 17:
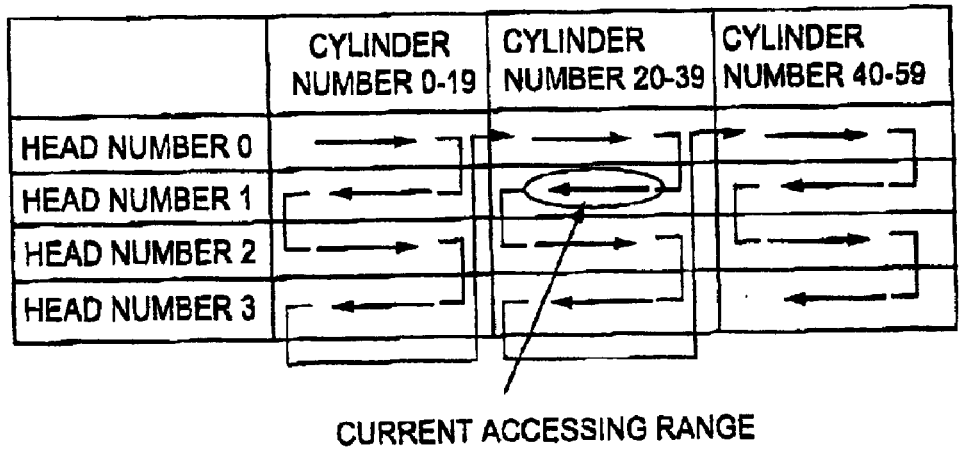
FIG. 17 is an explanatory diagram for explaining (in an example) a relation between a head moving direction, a cylinder and a head in a disk apparatus according to one embodiment of the present invention.

Now, FIGS. 16 and 17 show a sector number allocation system for continuous access in the disk apparatus. FIG. 16 is an explanatory view showing moving directions of the heads of the disk apparatus, and FIG. 17 shows a relation of movement between the cylinder numbers and the head numbers. FIGS. 16 and 17 take an example where the medium 1601 is partitioned into three zones 1602, 1603 and 1604, and, in each zone, the number of cylinders is twenty and the number of heads is four. As shown in FIG. 17, when the sector numbers are allocated in such logical order that access is performed from the cylinder 0 to cylinder 19 of the head 0, and next, from the cylinder 19 to the cylinder 0 of the head 1 in the same zone, then, access performance of the disk apparatus is sometimes improved.

In FIG. 17, when the encircled sectors in the area of the cylinder 39 through cylinder 20 of the head 1 are continuously accessed, defect information for each track is searched in descending order. In the case of TYPE2 system where defect tables are accessed in order of adjacent tracks while track numbers (each consisting of a disk physical head number and a disk physical cylinder number) are arranged in ascending order, the defect tables should be sometimes searched in descending order in contrast to the ascending order. In the case of TYPE1 where the defective track information is prepared, both moving directions of the head can be dealt with by searching the defective track information. On the other hand, in order to search in the reverse direction in the case where only the defect table information is used, it is sufficient to provide the defect byte count at two locations, as shown in FIG. 19. By this arrangement, search of the defect table in question can be performed without using the defective track information. When the defect table for the current track is used for track processing, the defect processing unit 1302 takes in the defect byte count that exists 2 words above the current defect table, in order to find the preceding defect table. The information stored in that area shows the byte count of the defective elements, and accordingly, it is possible to return to the preceding defect table, by returning the found byte count+3 words (1 word means 16 bits). Thus, in the case of the reverse access direction shown in FIG. 17, the track number (the disk physical head number and the disk physical cylinder number) of the defect table can be found, and it is easily judged if a defect exists in the location that the head is to access next.

FIGS. 24 and 25 respectively show an explanatory diagram for the buffer storage capacity in the case of the above-described TYPE2 and an explanatory diagrams for the buffer storage capacity in the case of the above-described TYPE3. And, FIG. 26 is an explanatory diagram showing comparison of numbers of times of accessing the buffer.

FIG. 24 shows the buffer storage capacity in the case of TYPE2. It is considered the case where quantity of defect management information is largest, i.e. the case where there is one sector skip in one track. In this case, the number of defective sectors increases linearly depending on the capacity of the apparatus. Here, are shown the cases where defects exist at 0.1% (ordinary case) and 1% of the sectors of the disk. From the results shown, it is found that, in the case of 0.1% (defects in the sectors of an ordinary apparatus), capacity of the defect information ends in 3.8 MB, i.e., a little over 10% of the buffer memory size 32 MB, even when the capacity of the apparatus is 120 GB.

Further, FIG. 25 shows the case of TYPE3 where a defective track number and the corresponding defective elements are put in a set. In the same conditions as in the FIG. 24, capacity of the defect information ends in 4.2 MB, i.e., also about 13% of the buffer memory size 32 MB.

Further, FIG. 26 shows states of the number of times of accesses for defect search of the buffer in TYPE1, TYPE2 and TYPE3. In FIG. 26, the horizontal axis indicates the place in the sequence of storage, i.e., indicates where the defect table information of the track information in question exists, counting from the top of the defect table information. And, the vertical axis indicates the number of times of buffer accesses required for reaching the track information. In fact, quantity of data transfer in accessing the buffer is not taken into consideration. Further, it is assumed that a defect exists for each track. In FIG. 26, it is found that, in the case of TYPE1 where the information indicating existence of defects is prepared for all the tracks, the number of times of accessing the buffer is largely suppressed. In the other cases, the number of times of accessing the buffer increases linearly depending on the storage depth of the defect table information.

Figure 27:
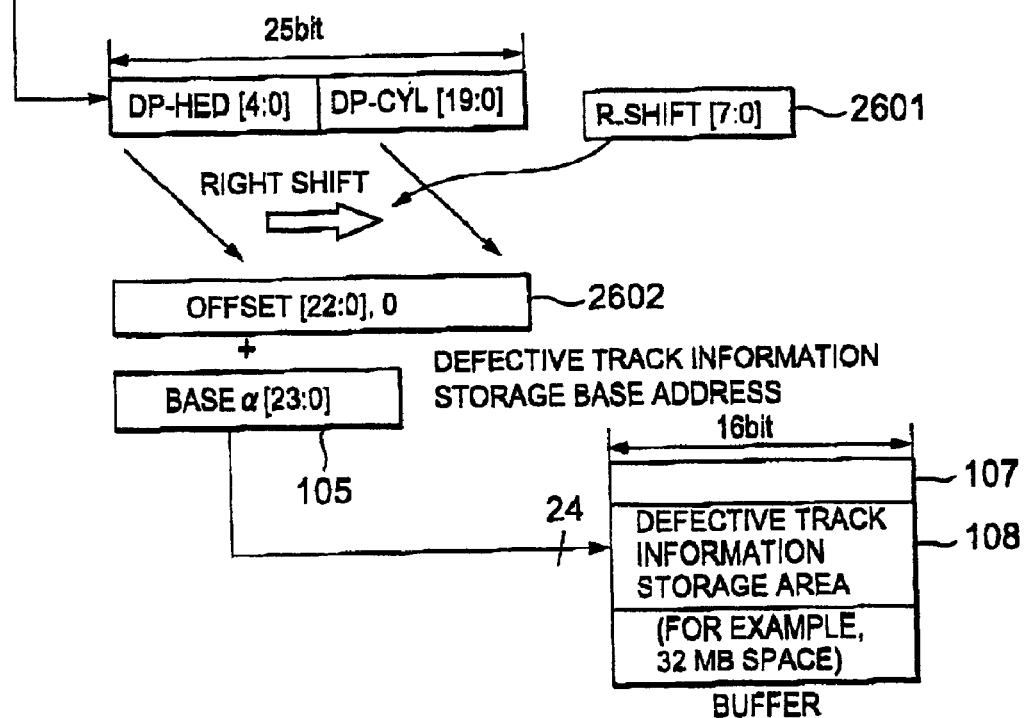
FIG. 27 is an explanatory diagram (first) for explaining a method of generating an offset address of defective track information in a disk apparatus according to one embodiment of the present invention.

Next, a variation of the first embodiment will be described. The present embodiment shows a method of preventing relative increase of the defective track information, which indicates existence of defects for all the tracks, as the apparatus capacity increases. In the case of TYPE1, one bit indicates defect information for one track. On the other hand, in the present embodiment, one bit indicates defect information for a plurality of tracks. In this case, when there exists one or more defective tracks in a plurality of tracks, the value "1" is set to indicate existence of a defective track or defective tracks. As shown in FIG. 27, an R-SHIFT register 2601 is provided, and, by shifting a track number, the tracks are partitioned into groups each consisting of a plurality of tracks.

Figure 28:
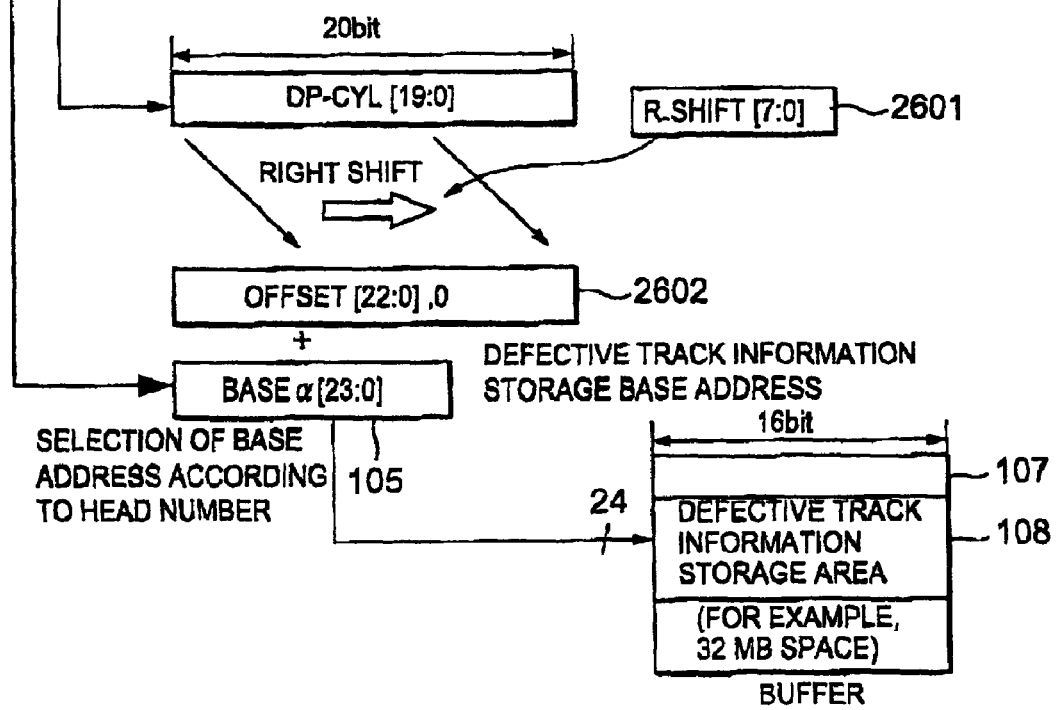
FIG. 28 is an explanatory diagram (second) for explaining a method of generating an offset address of defective track information in a disk apparatus according to one embodiment of the present invention.

Further, FIG. 28 shows a method where a storage base address BASEα 105 for the defective track information is selected based on a physical head number, and a physical cylinder information DP-CYL is shifted by means of the R-SHIFT register 2601. In order to compress the defective track information, the number of tracks expressed by one bit is decided in advance, and a shift amount is decided based on the number of tracks expressed by one bit.

FIG. 29 shows which physical cylinders are covered by each bit of the defect existence information in a defective track element 2901. FIG. 29 shows an example where defect existence information is shown for each four cylinders, i.e., four tracks.

Figure 30:
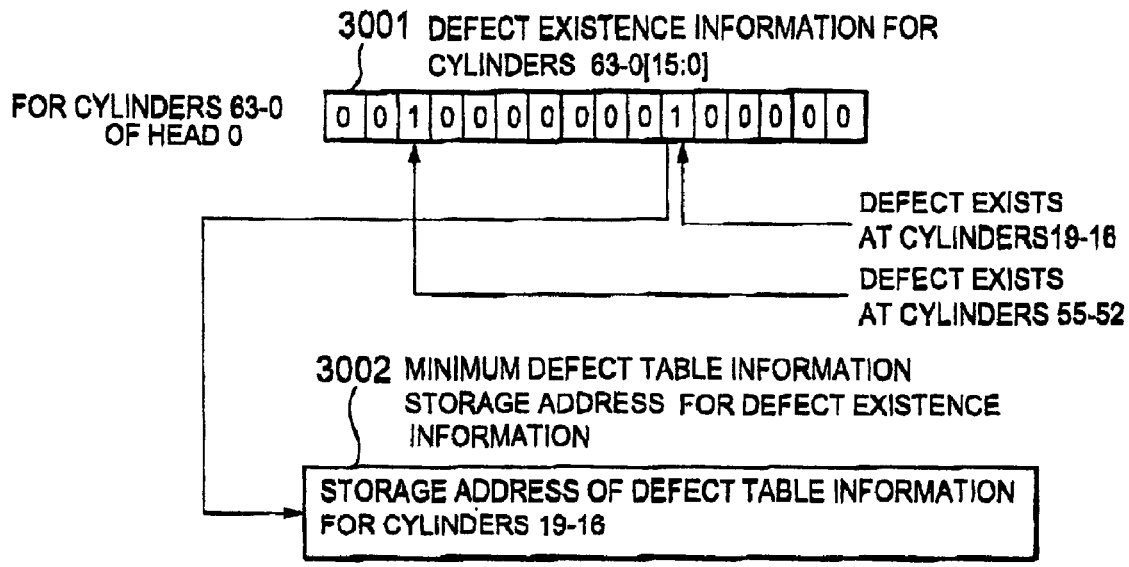
FIG. 30 is an explanatory diagram (TYPE4) showing an example of format of defect table information storage address in a disk apparatus according to one embodiment of the present invention.

FIG. 30 shows an example of the case shown in FIG. 29. FIG. 30 shows a case where defective tracks exist actually in the bit 5 (for the cylinders 19–16) and in the bit 13 (for the cylinders 55 –52). In this case, similarly to TYPE1, the defect table information storage address for the bit 5 is stored as the defect table storage address.

According to the present embodiment, defective track information of the defect control information can be compressed, and the buffer capacity can be reduced. Here, for the sake of convenience, the format type shown in FIG. 29 is referred to TYPE4 in the following.

FIG. 31 shows summary of the defect control systems of TYPE1–TYPE4. –TYPE4. As shown in FIG. 31, in the cases of TYPE1 and TYPE4, the number of times of accessing the buffer can be limited and uniformed without depending on a storage location of the defect table information. It is found that TYPE4 can suppress increase of the volume of the defect management information also, and its architecture is suitable for implementation by circuit. Such evaluation criteria change depending on a system to realize, and the best system for each apparatus can be selected.

The values in the above description have been used for the sake of convenience of describing examples, and do not limit those embodiments.

As described above, according to each embodiment described above, defect control can be performed efficiently. In the case where an area of defect existence information and the corresponding area of pointer information are stored in a set for each range of the same tracks, the defect existence information and the pointer information in the case of existence of a defect can simultaneously taken in by one time of access to the buffer having the bus width of several bytes. Thus, deterioration in data transfer ability of the buffer can be suppressed to the utmost. Further, since the defect existence information for n tracks (n is an integer larger than or equal to 2) is expressed in one unit, the defect existence information can be reduced to 1/n, and the buffer capacity can be reduced. Further, by expressing the defect pointer information corresponding to the defect existence information as an offset from a base address whose argument is a track accessed by the head, it is not necessary that the all the buffer space is covered by the bit width of a pointer address of the defect table information used for defect control, thus reducing the buffer capacity.

As described above, the present invention can realize a disk apparatus in which defect control can be performed efficiently, and can reduce the volume of the control information furthermore,

What is claimed is:

1. A disk apparatus for reading and writing data to a storage medium, wherein:

said disk apparatus comprises:

a storage means for storing pieces of defective track information into areas at respective addresses each corresponding to physical track number information, with each piece of the defective track information indicating existence of defective tracks in a plurality of tracks, and for storing pieces of defect information in predetermined groups, with each piece of the defect information indicating information on a defective track in said plurality of tracks; and a processing means for receiving an instruction of read or write to a track of said storage medium, for referring to said storage means, and for performing defect processing on a defective track, wherein said storage means stores pieces of pointer information for groups of said pieces of defective track information, with each piece of the pointer information indicating a start address of a storage area for each of said predetermined groups, and when said processing means receives an instruction of read or write to a track of said storage medium, said processing means refers to a piece of said defective track information based on said respective addresses, and then, when existence of a defective track is indicated, refers to a piece of pointer information for group to which said piece of the defective track information belongs, accesses the pieces of defect information on defective tracks sequentially from a storage area indicated by said piece of pointer information, detects defect information when the track as an object of said instruction is a defective track, and performs defect processing on said defective track based on said defect information.

2. The disk apparatus according to claim 1, wherein: said storage means stores, for each said piece of defect information, physical track number information on said defective track, information indicating a method of the defect processing, and a storage capacity of said piece of defect information or an end location of a storage area for said piece of defect information.

3. The disk apparatus according to claim 1, wherein:

said disk apparatus further comprises a holding means for holding a number of said plurality of tracks corresponding to one piece of defective track information; and said number held by said holding means is set from outside of the holding means.

4. The disk apparatus according to claim 1, wherein:

said processing means accesses a storage area for said defective track information, according to an address obtained by adding a predetermined base address to an address corresponding to said physical track number information.

5. The disk apparatus according to claim 1, wherein;

said defect processing performs at least either of skipping processing, in which a defective sector is replaced by a normal sector, and skipping processing, in which a defective sector is replaced by a normal sector that physically follows said defective sector.

* * * * *